United States Patent [19]
Aschliman et al.

[11] Patent Number: 5,175,536
[45] Date of Patent: Dec. 29, 1992

[54] APPARATUS AND METHOD FOR ADAPTING CARDS DESIGNED FOR A VME BUS FOR USE IN A VXI BUS SYSTEM

[75] Inventors: Larry D. Aschliman, Jacobus, Pa.; Randy J. Kelsey, Hampstead, Md.

[73] Assignee: Westinghouse Electric Corp., Pittsburgh, Pa.

[21] Appl. No.: 561,845

[22] Filed: Aug. 1, 1990

[51] Int. Cl.$^5$ .............................................. H04B 1/00
[52] U.S. Cl. .......................... 340/825.04; 340/825.52
[58] Field of Search ...................... 340/825.03, 825.04, 340/825.07, 825.52; 364/200 MS File, 900 MS File; 370/85.7, 85.9, 92, 93, 99

[56] References Cited

U.S. PATENT DOCUMENTS

| | | | |
|---|---|---|---|
| 4,404,556 | 9/1983 | Messina et al. | 340/825.04 |
| 4,598,360 | 7/1986 | Loskorn | 364/200 |
| 4,733,390 | 3/1988 | Shirakawa et al. | 370/85.7 |
| 4,885,569 | 12/1989 | Lellouche | 340/825.04 |
| 4,908,823 | 3/1990 | Haagens et al. | 340/825.03 |

Primary Examiner—Donald J. Yusko
Assistant Examiner—Dervis Magistre
Attorney, Agent, or Firm—John K. Williams; Norman A. Nixon

[57] ABSTRACT

A method and device for adapting a VME card for use in a VXI system are disclosed. The device resides on a circuit board that is plugged between the VXI bus and the VME card. The device provides two or more sets of VXI configuration registers. Each region of addresses normally used by the VME card is assigned to one of the simulated VXI units, and the device modifies incoming VXI addresses directed to each region so that the VME card responds to the VXI address. The VXI units simulated by the device may include one message-based device and one register-based device, so that both capabilities are available to the VME card. The device buffers signals passing between the VME card and the VXI bus, generating delays and timing signals to produce proper operation of all system components. The device provides bidirectional communication between the VME card and the VXI bus, so that the VME card can be the VXI bus master. The registers of the device can be configured manually by the user or dynamically by the VXI resource manager, permitting full operational conformance with the VXI specification. VME user-defined signals generated by the card are available on an auxiliary connector but are not passed through to the VXI bus.

36 Claims, 20 Drawing Sheets

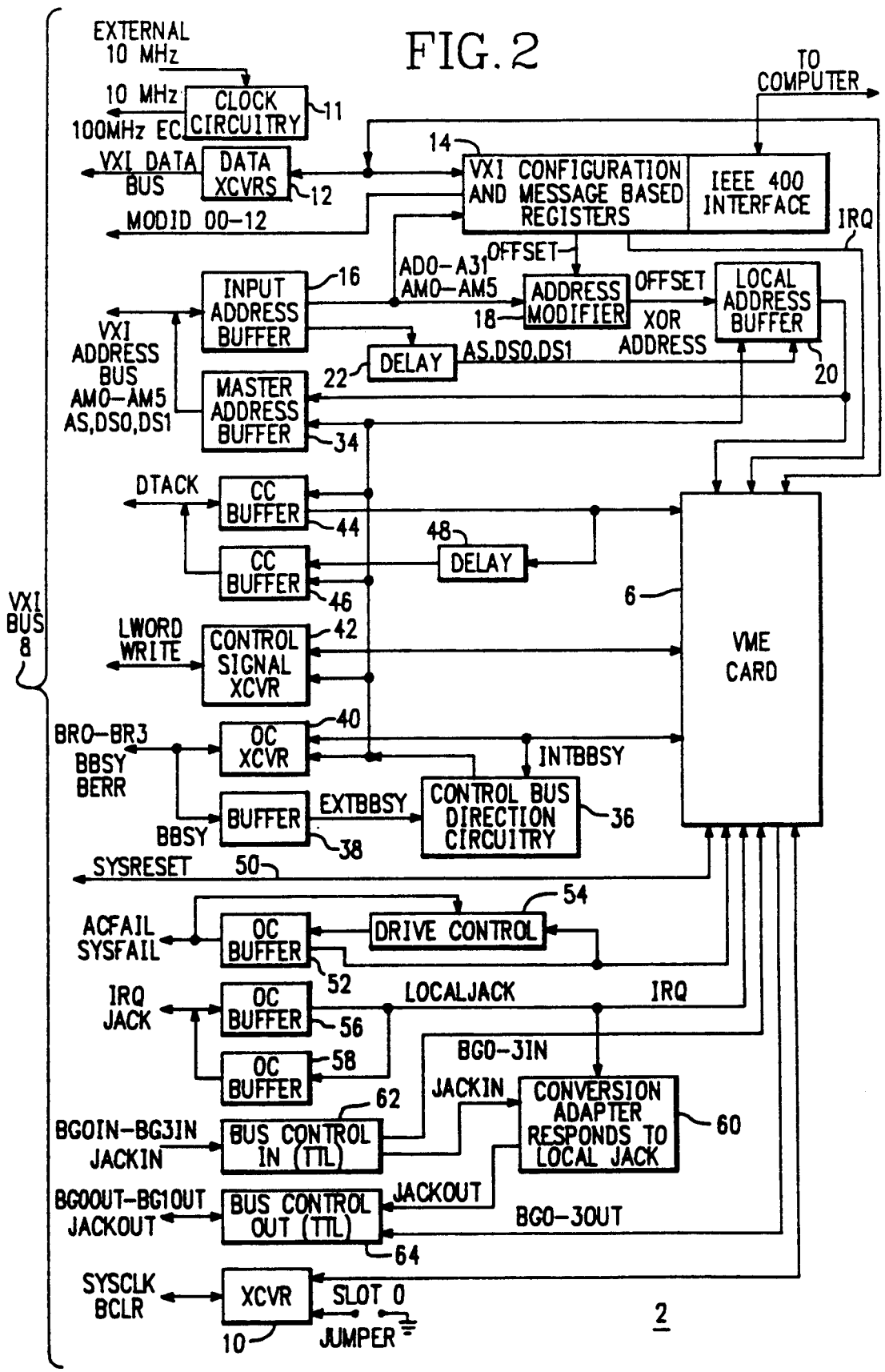

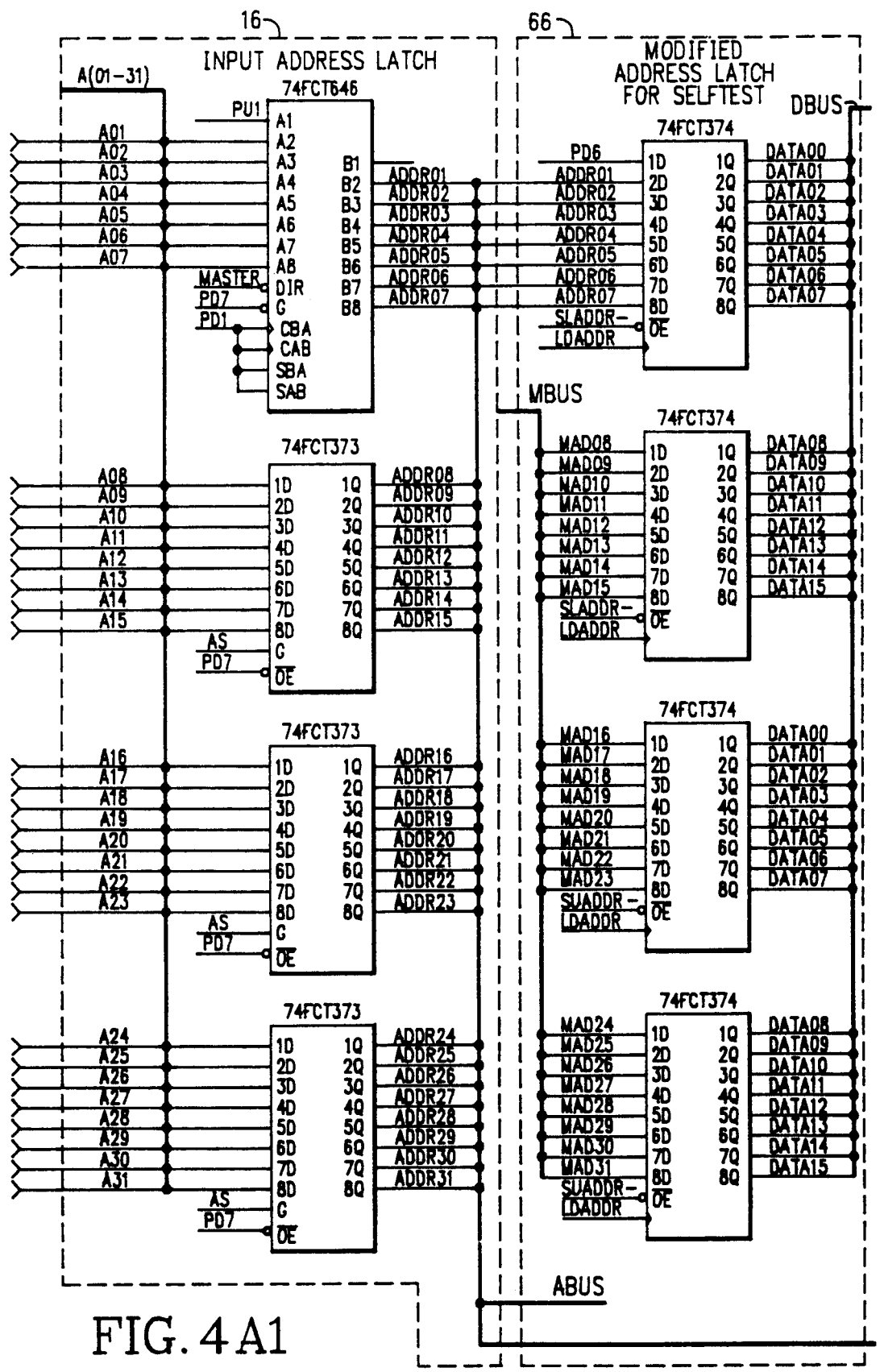
FIG. 4A1

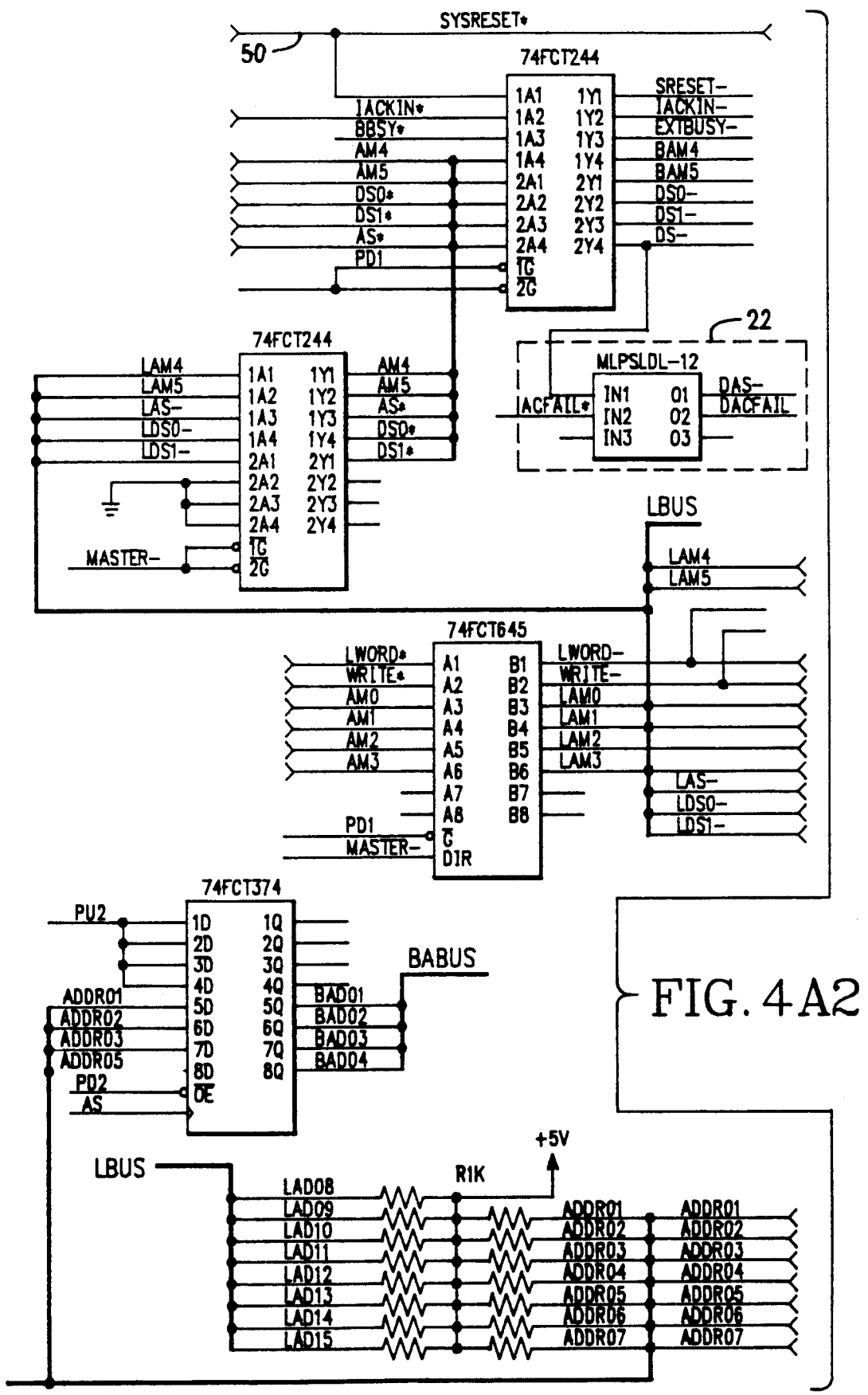
FIG. 4A2

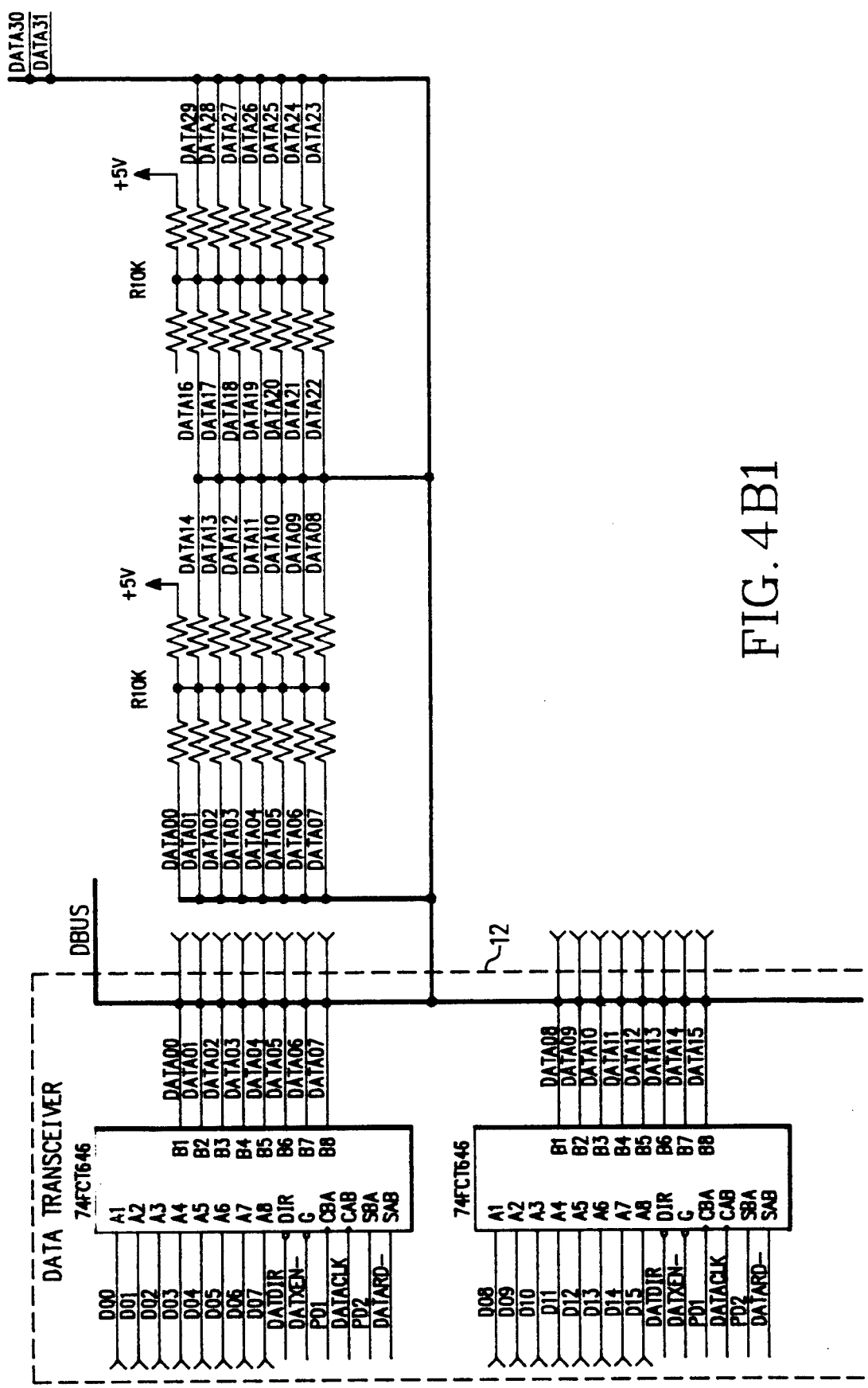
FIG. 4B1

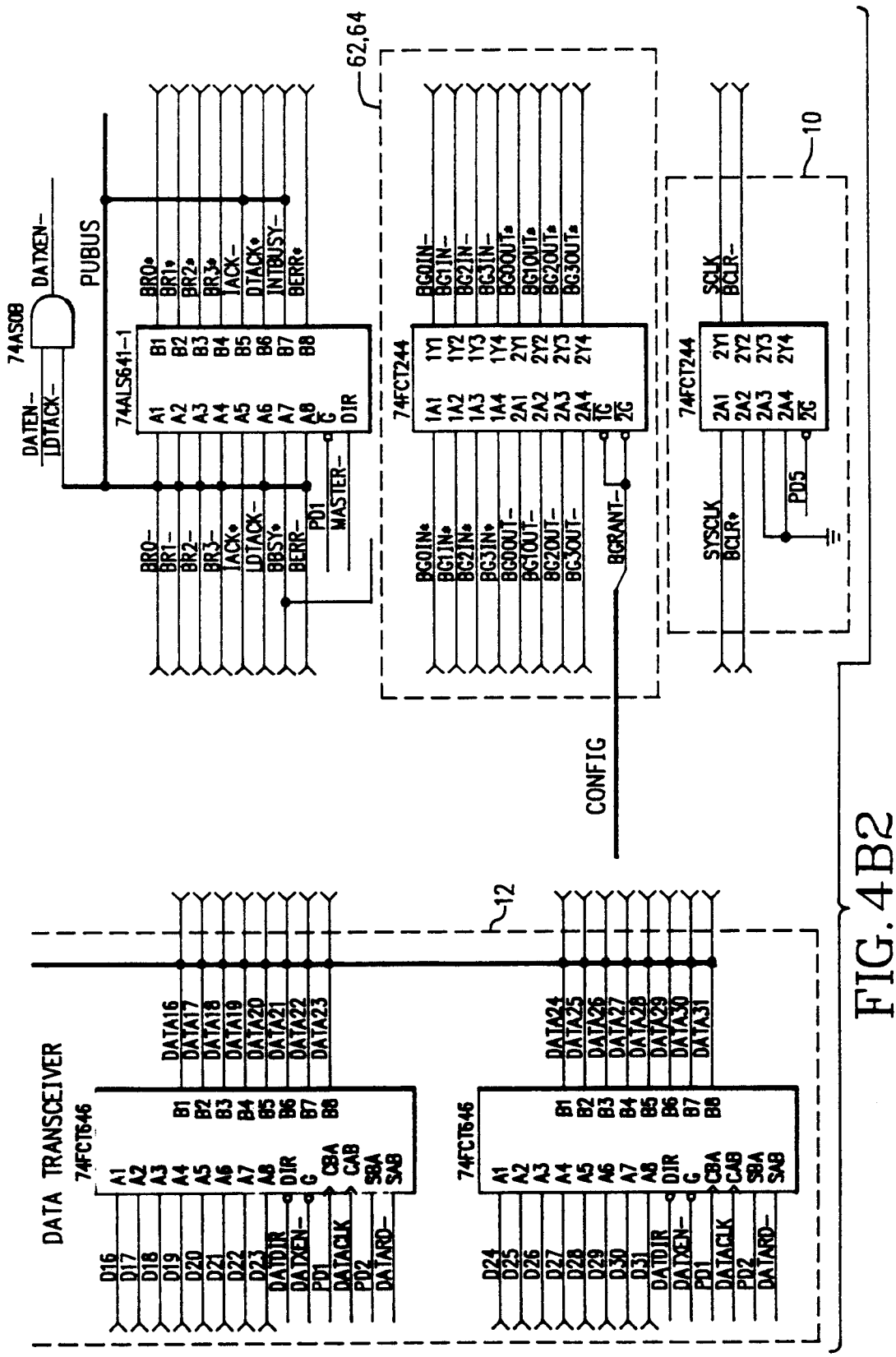
FIG. 4B2

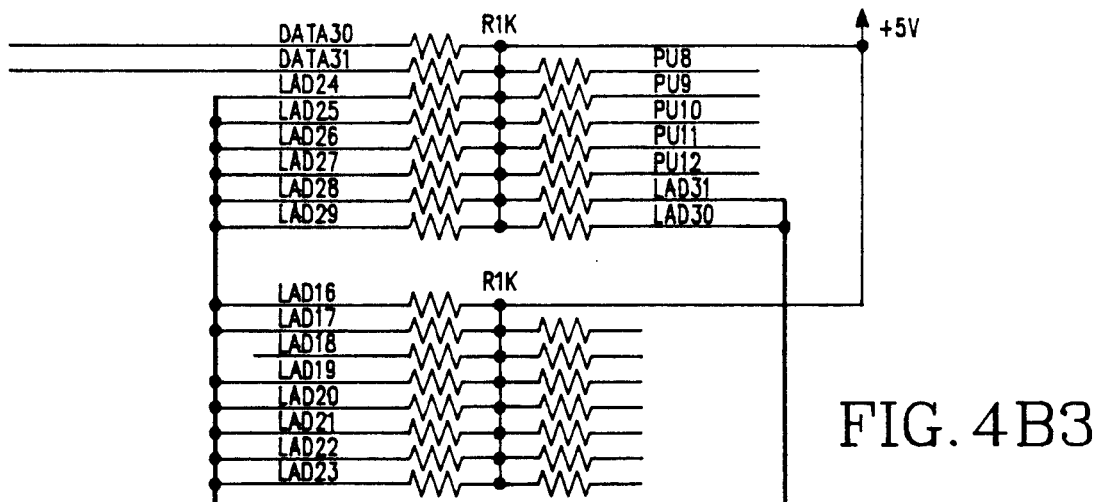
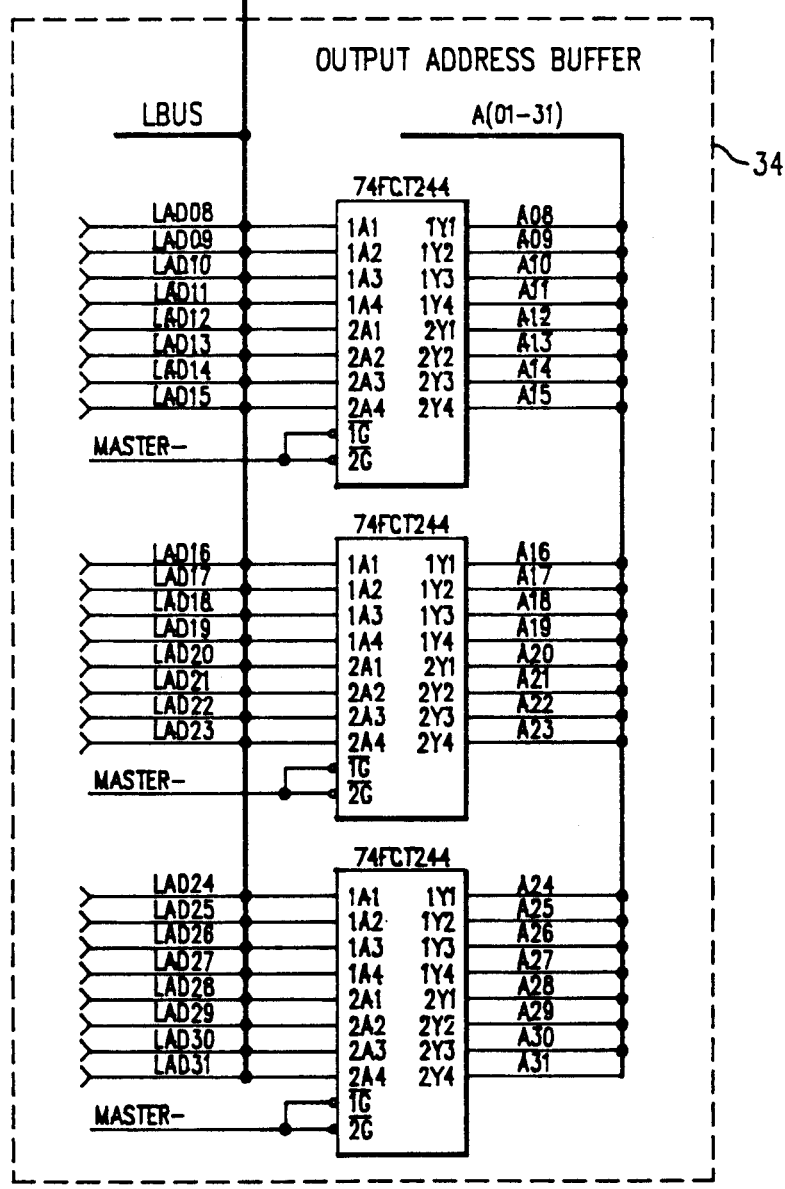
FIG. 4B3

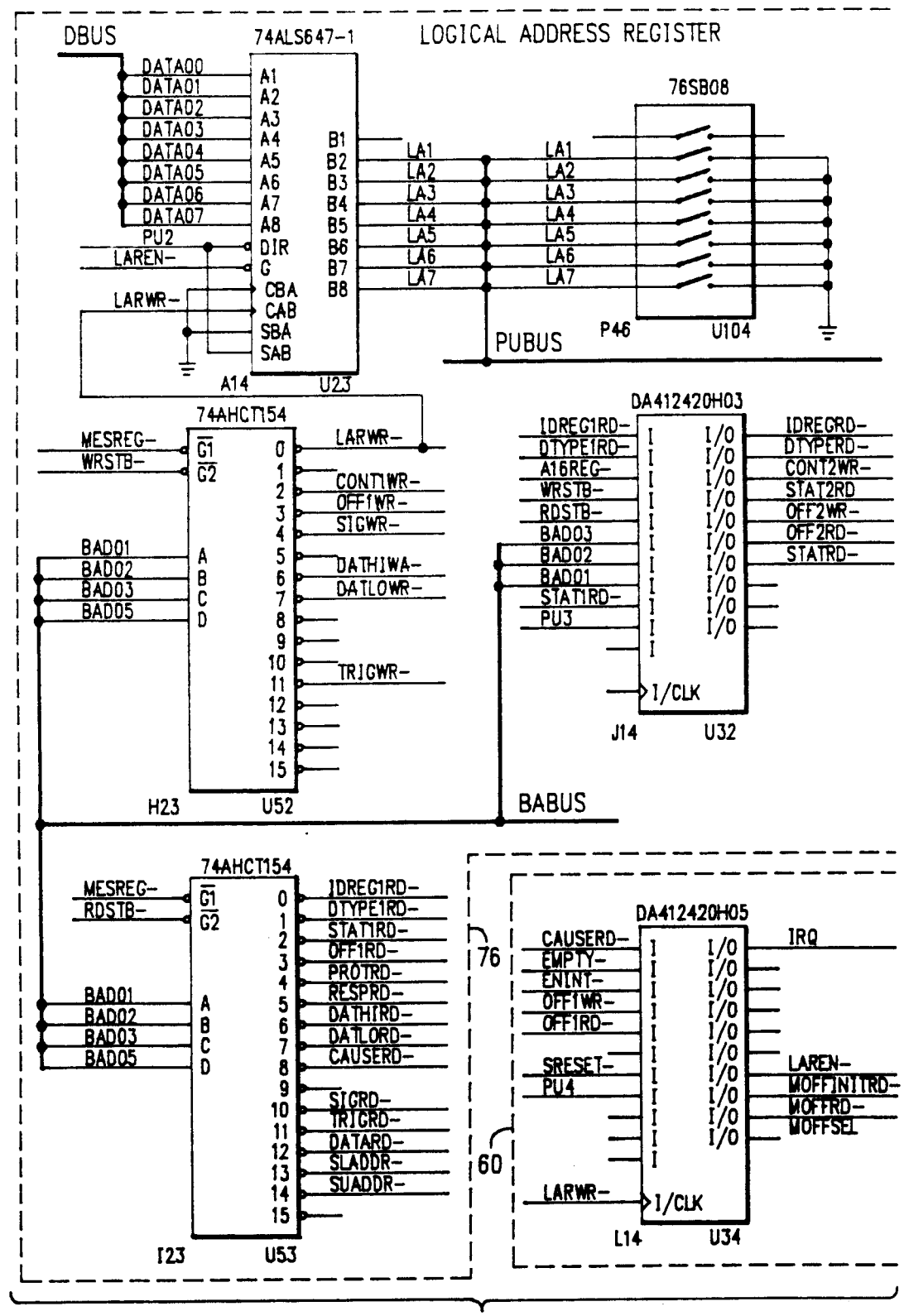
FIG. 4C1

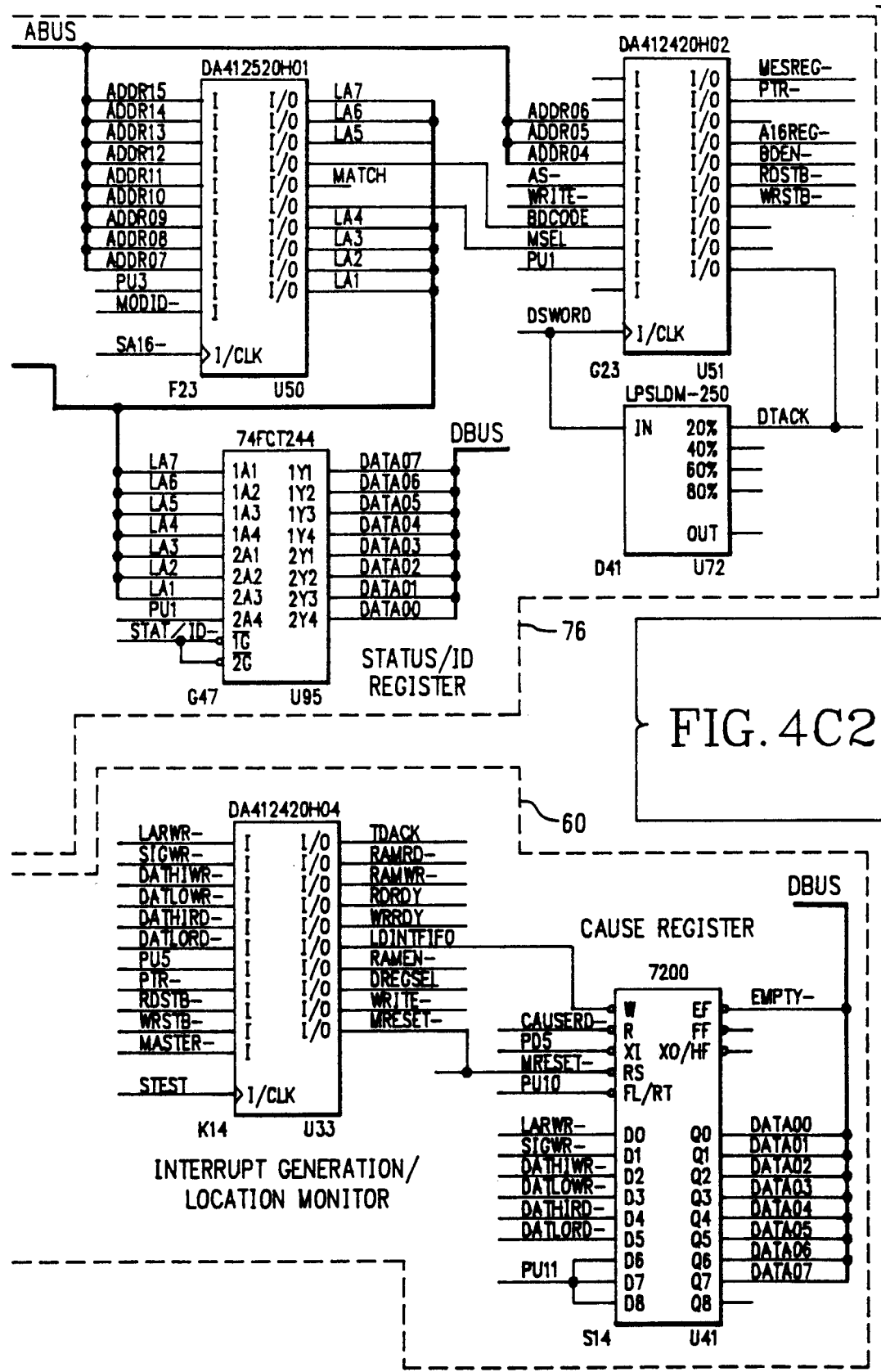
FIG. 4C2

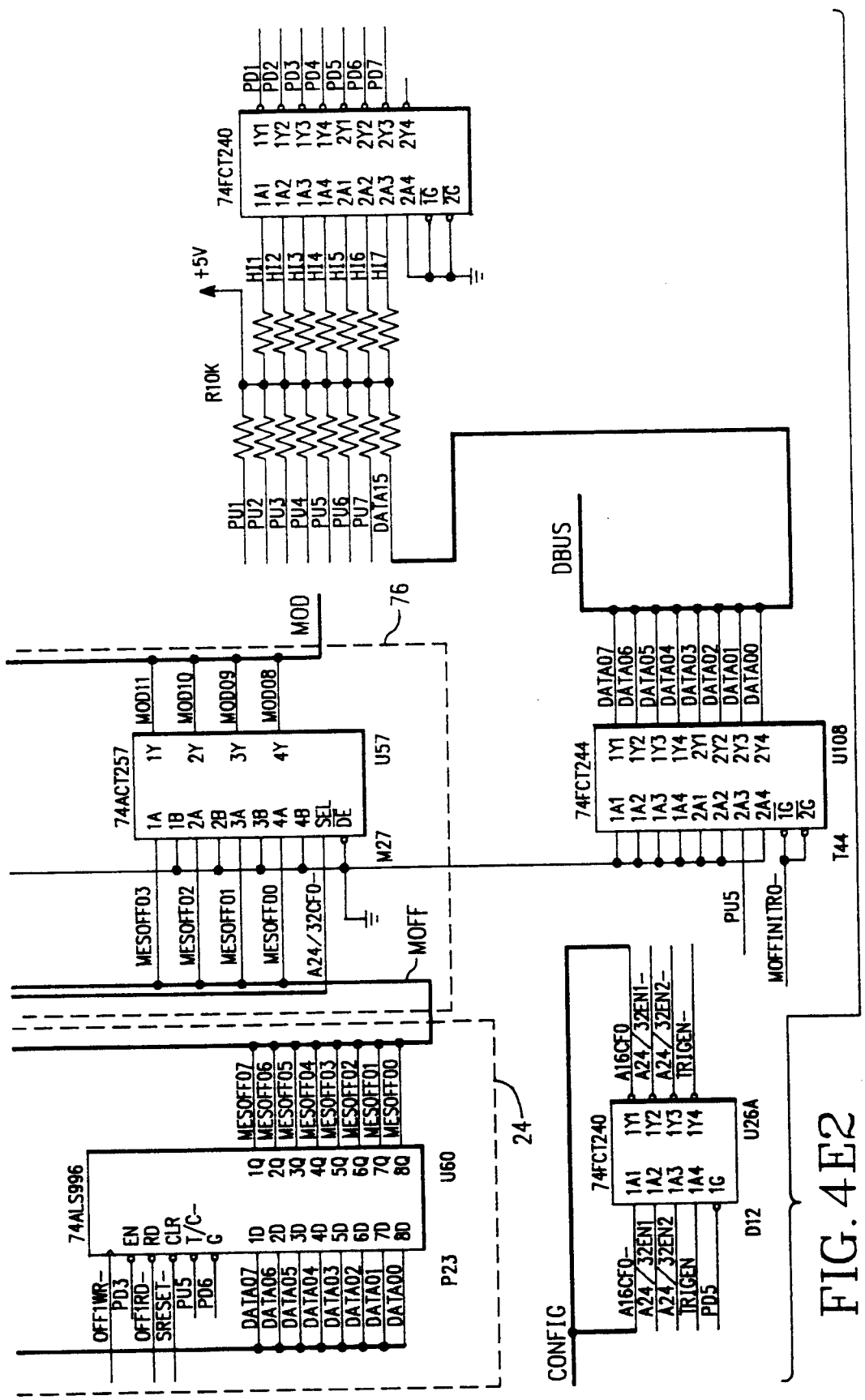
FIG. 4E2

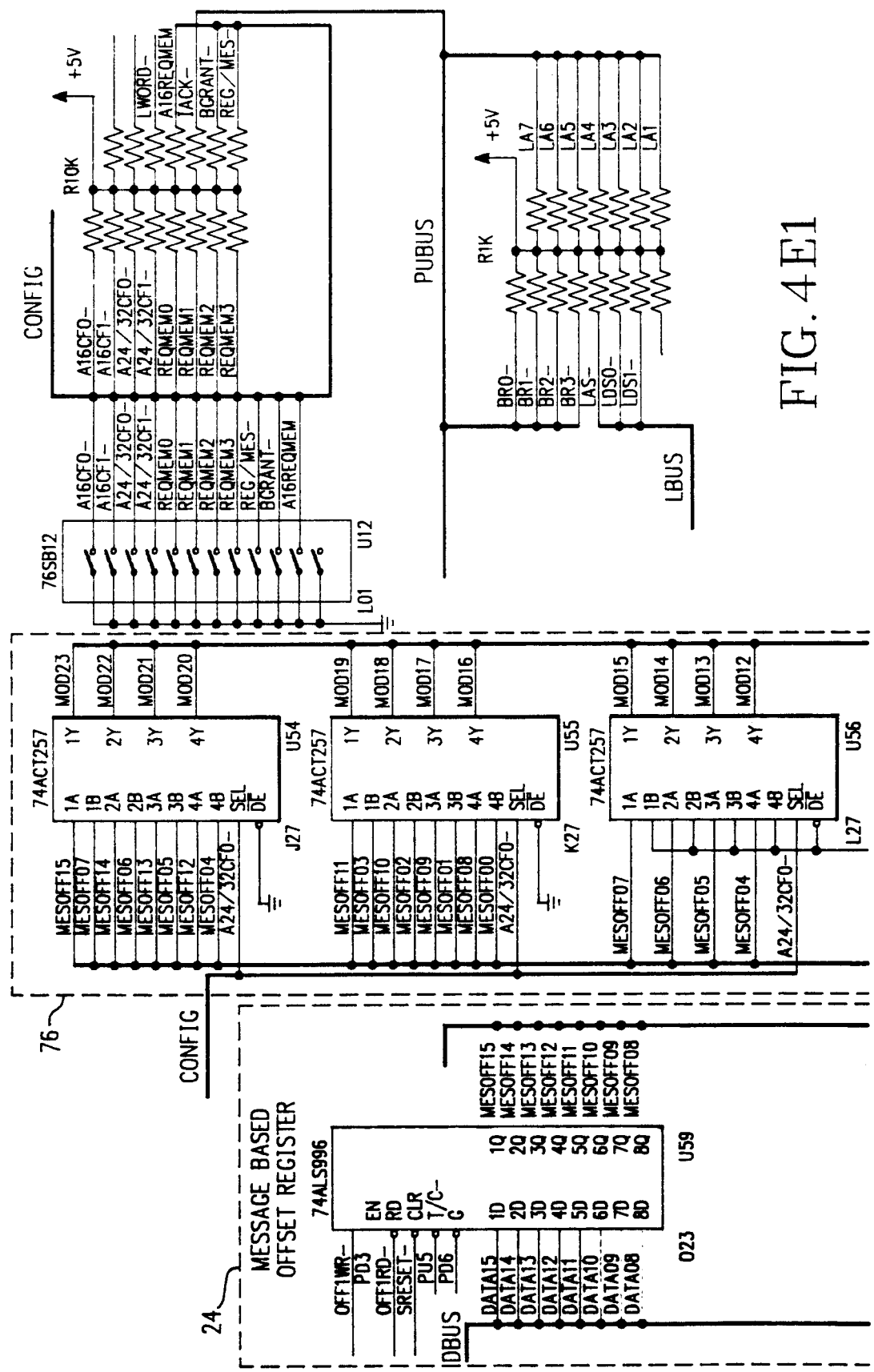
FIG. 4E1

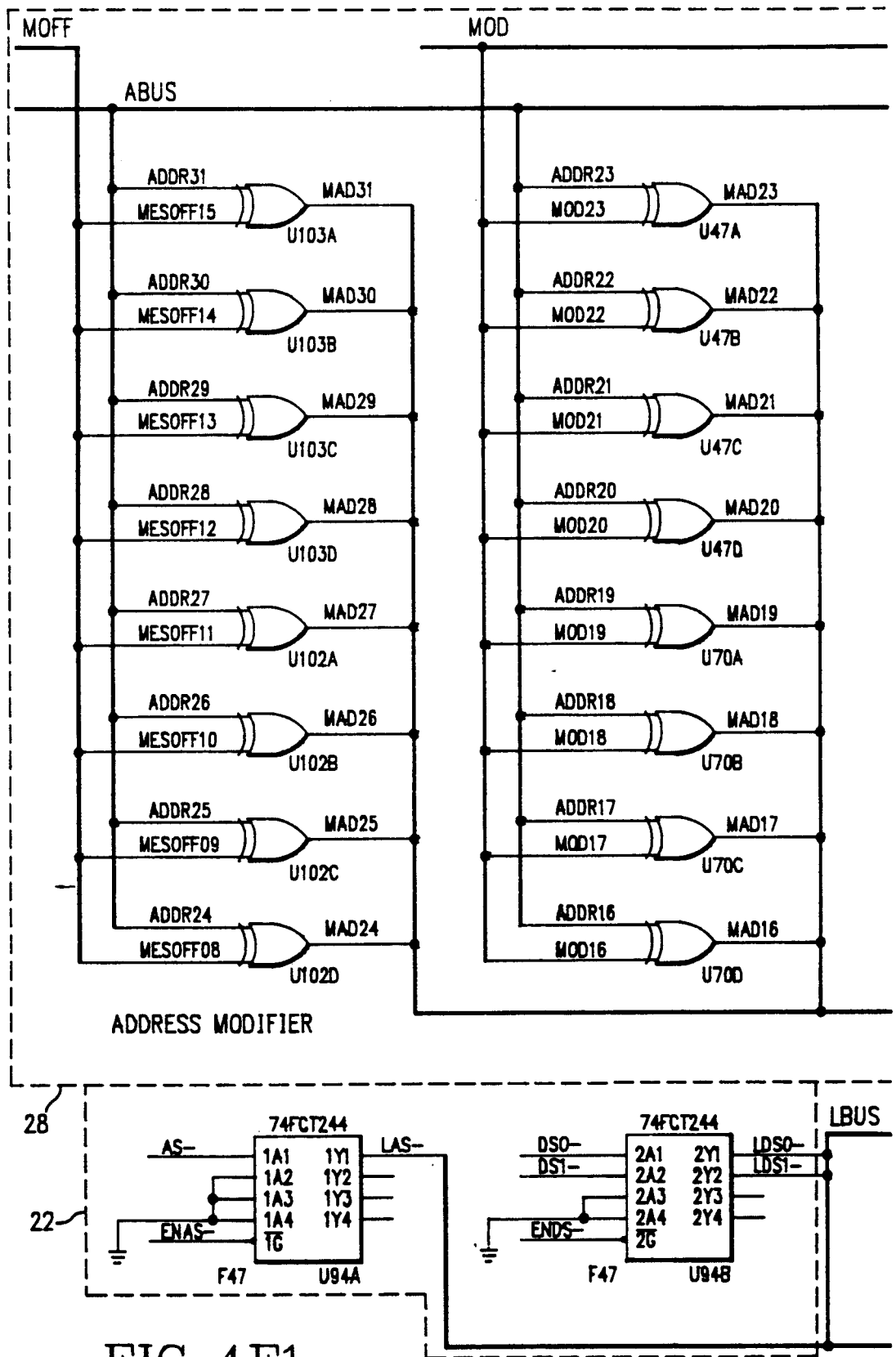
FIG. 4F1

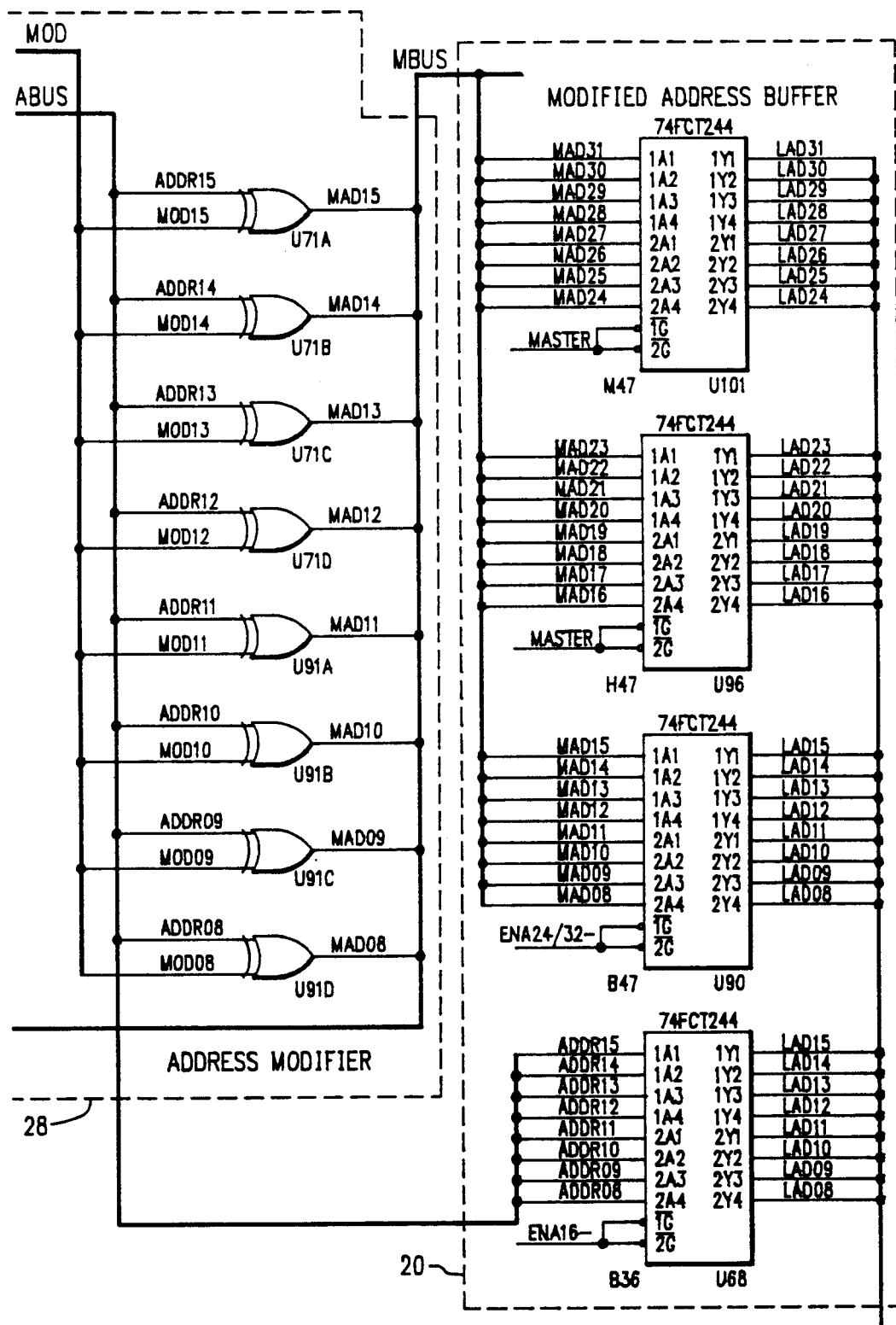
FIG. 4F2

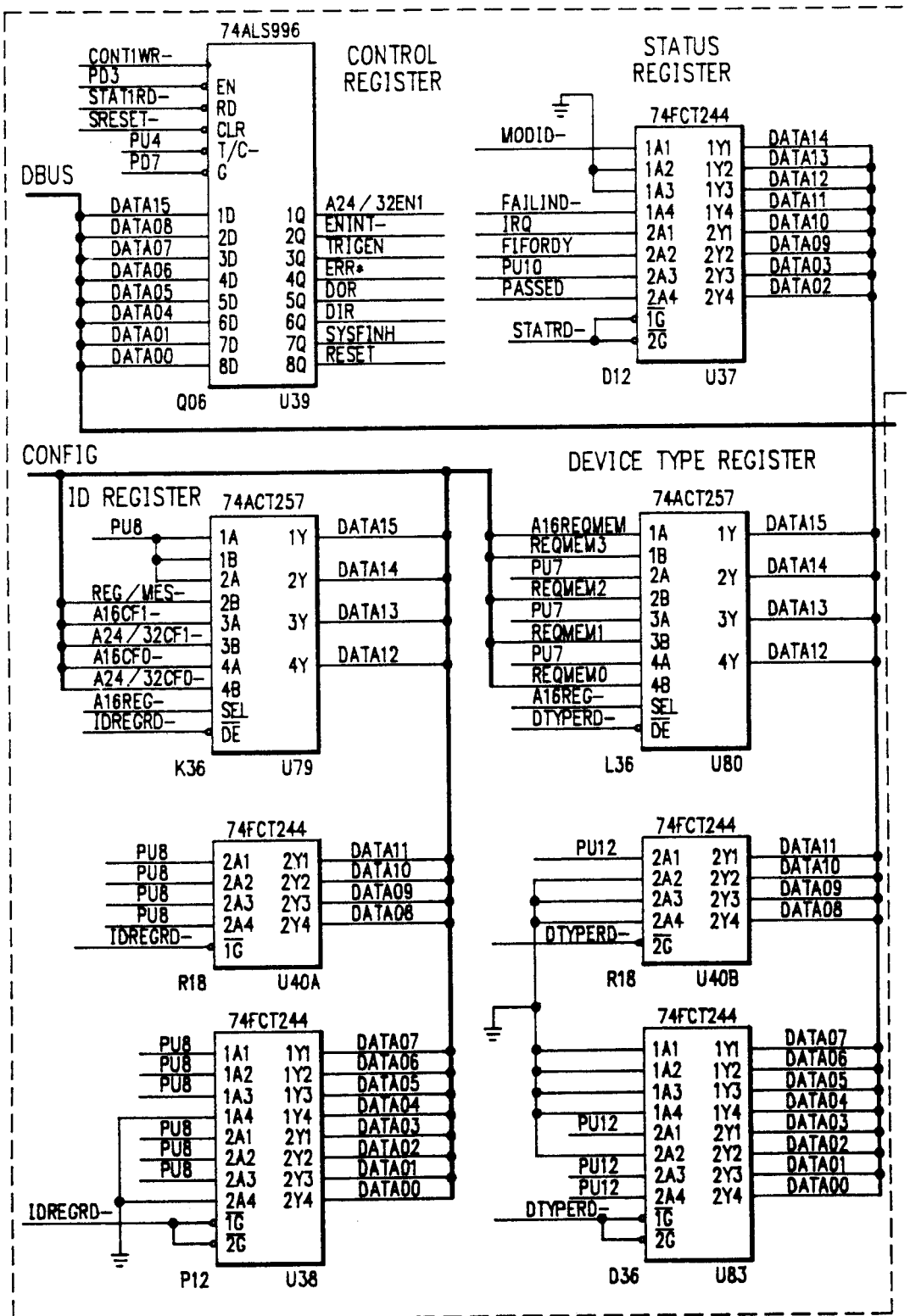
FIG. 4G1

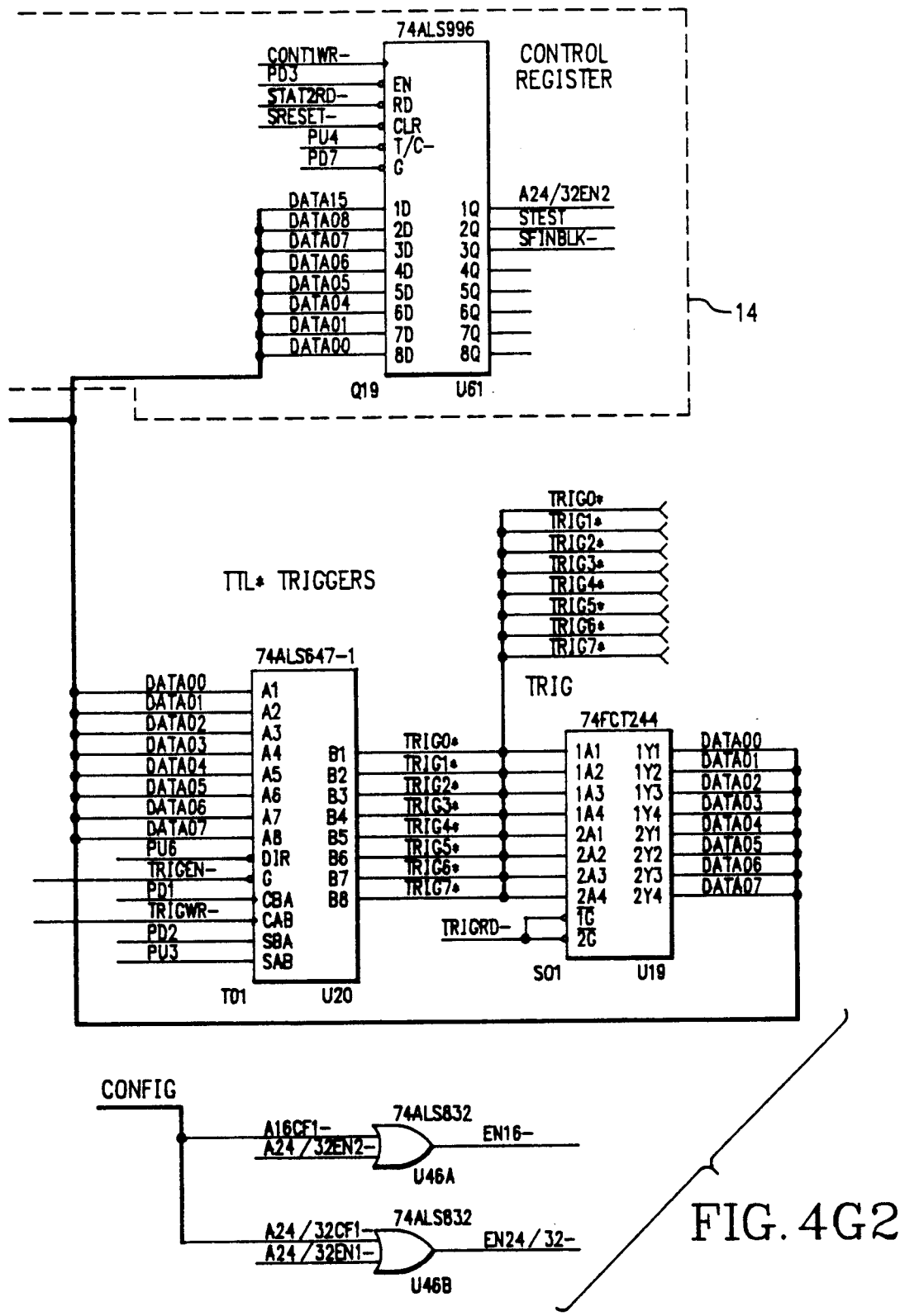
FIG. 4G2

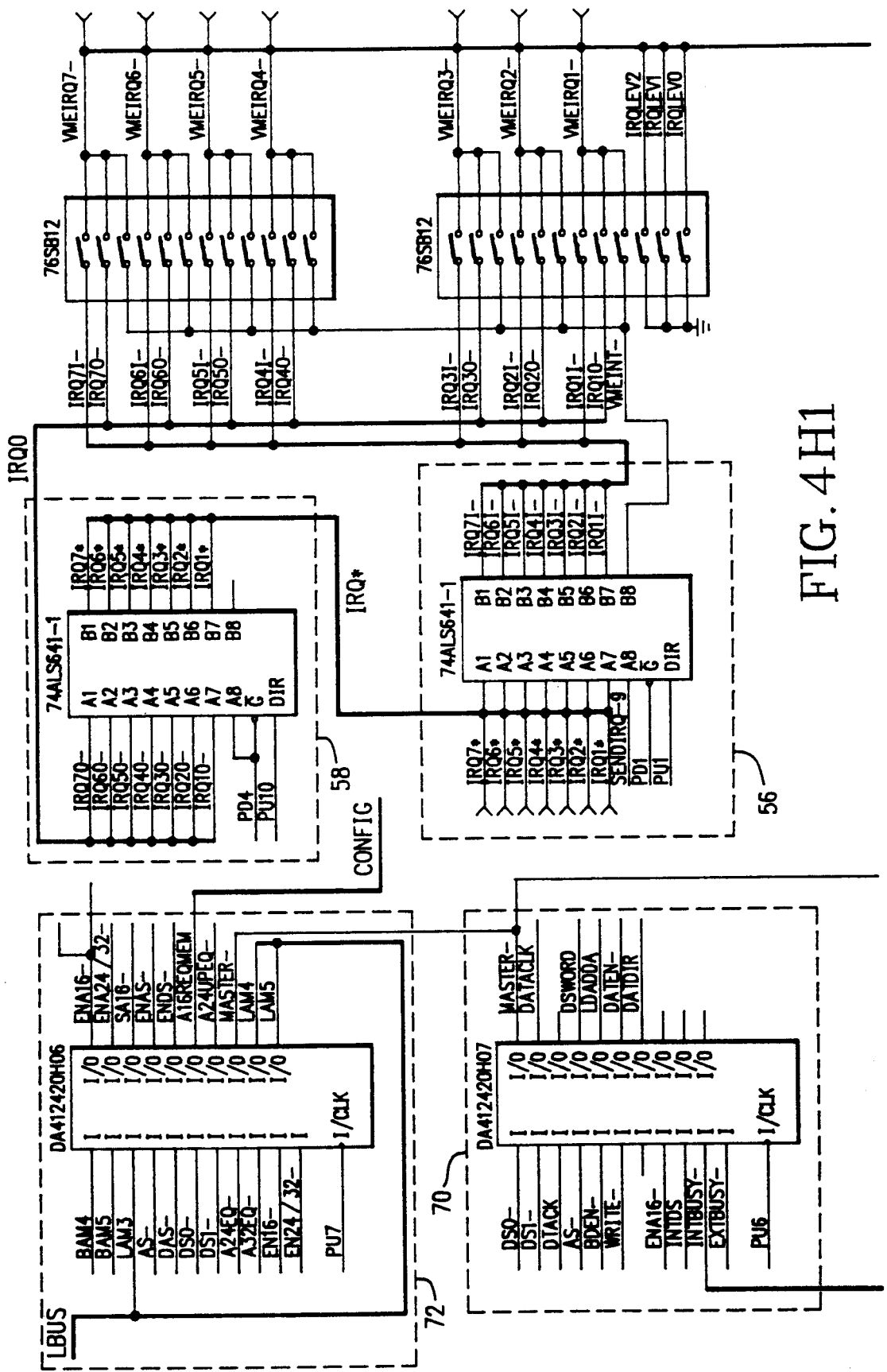
FIG. 4H1

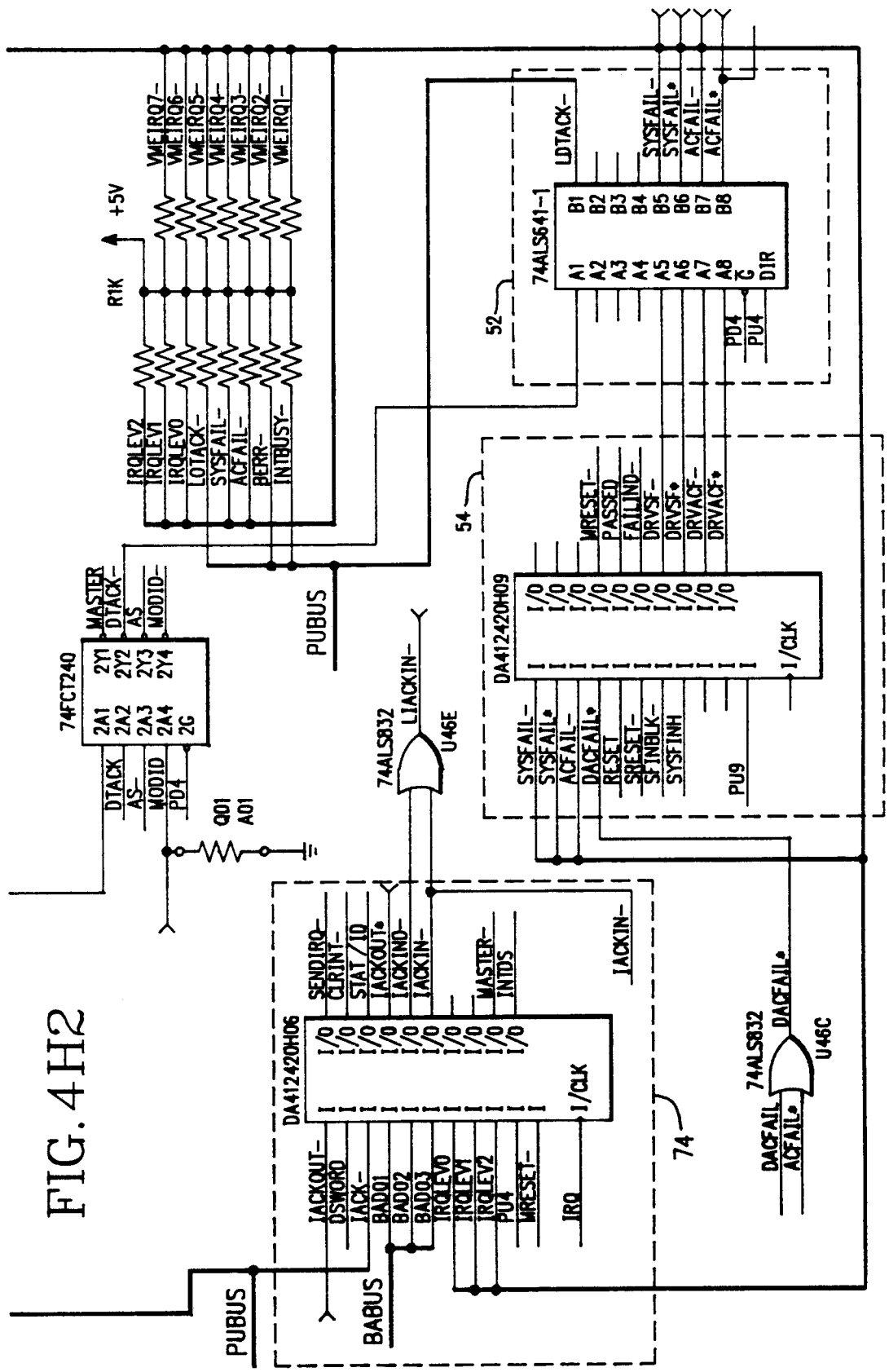
FIG. 4H2

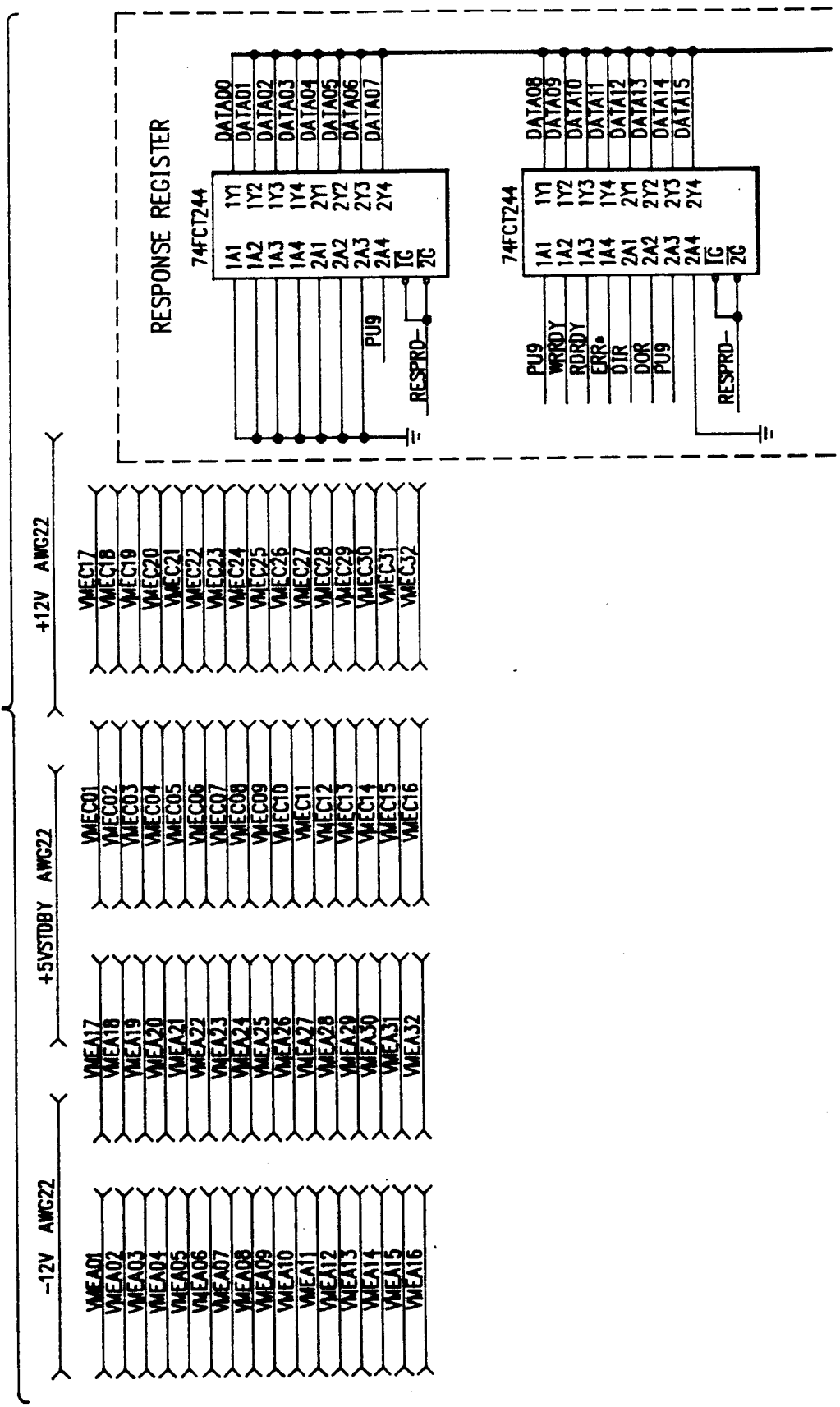
FIG. 4I1

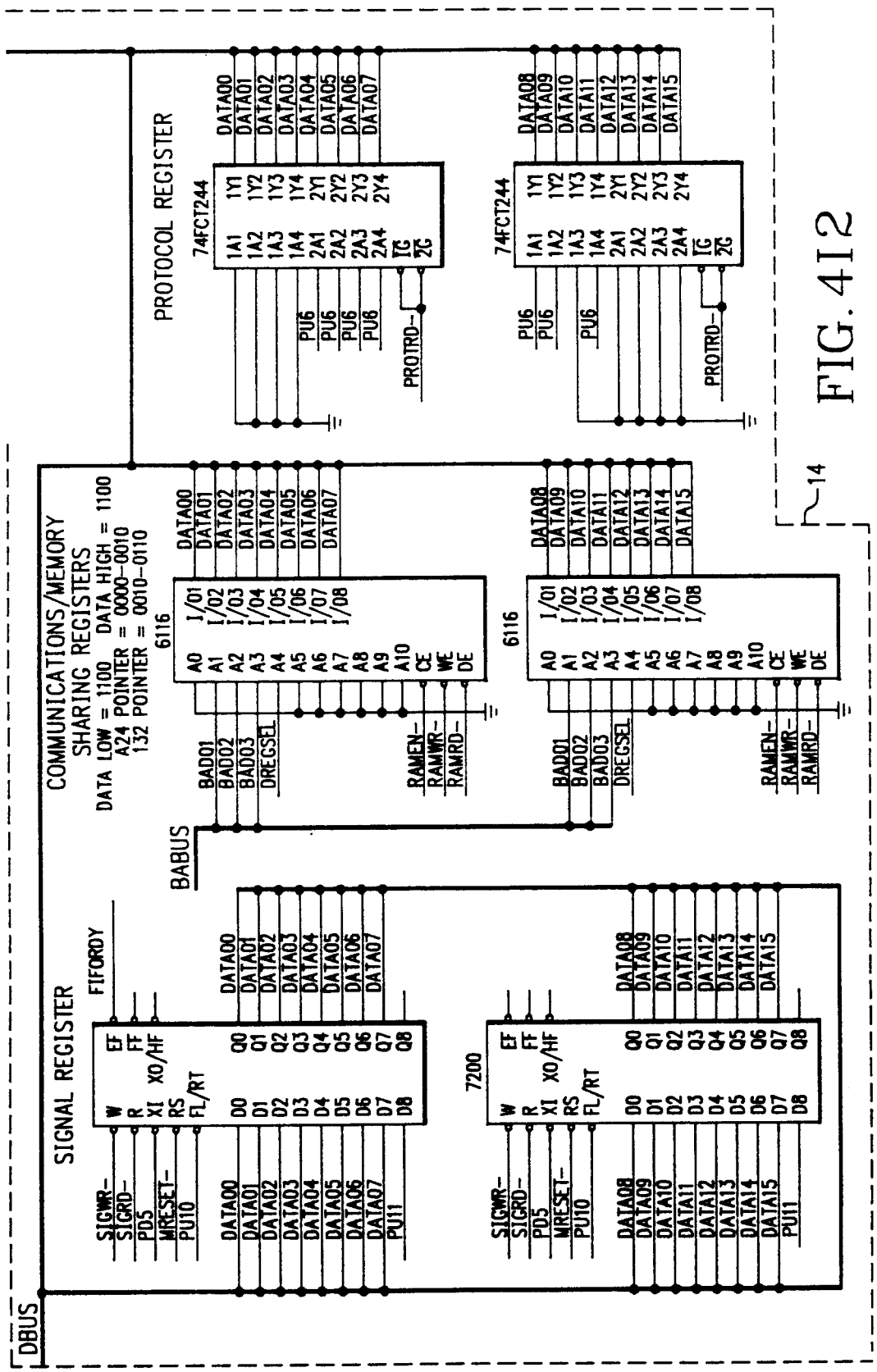
FIG. 4I2

APPARATUS AND METHOD FOR ADAPTING CARDS DESIGNED FOR A VME BUS FOR USE IN A VXI BUS SYSTEM

BACKGROUND OF THE INVENTION

In the early 1980s, the electronics industry perceived a need for a standardized 16 and 32 bit backplane that would allow a wide variety of devices from diverse manufacturers to coexist and interact within a single system. In response to this need, an international group of major electronics manufacturers began development of the VME bus standard. This standard specifies both hardware requirements, such as connector configuration and placement, and signaling requirements. Since then, the VME bus has been further developed and has become an official IEEE and IEC standard. The VME bus is currently the most popular 16/32 bit backplane bus in the United States and Europe, and is widely used in industrial control, digital testing, signal processing, and as a building block for general purpose computers. Thousands of VME bus-compatible cards are available in the marketplace.

However, the VME bus standard was perceived to be too general and unspecific for widespread use in the field of instrumentation. Therefore, a consortium of manufacturers recently developed specifications for the VME bus Extensions for Instrumentation, known in shorthand as the VXI bus.

For a complete understanding of the environment in which the system described herein operates, the reader is referred to the following publications, which are incorporated in the detailed disclosure herein by reference: *The VMEbus Specification Manual*, Revision C.1, published October 1985 by Micrology pbt, and available from Printex or the VMEbus International Trade Association (VITA), both of Scottsdale, Ariz.; and *VMEbus Extensions for Instrumentation: VXIbus System Specification*, Revision 1.2, published June 1988, which can be obtained through the VXIbus Consortium, P.O. Box 370599, San Diego, Calif. 92137.

VME cards are, broadly speaking, plug-compatible with the VXI standard, but there are significant differences between the two standards. Although the above-referenced documents describe the VME and VXI systems completely, it will be convenient here to briefly discuss some of these differences.

One significant difference is that the VXI standard provides bus conductors and conductor definitions in addition to those of the VME standard. The VME standard provides two identical connectors (referred to as P1 and P2) on the VME backplane. The VXI standard provides a third identical connector (the P3 connector) on its backplane to allow access to the bank of additional conductors. Further, many of the conductors terminating on the VME P2 connector are user-defined, while all conductors on the VXI P2 and P3 connectors are defined by the VXI standard. Therefore, when a VME card is plugged directly into a VXI backplane, the signals from the VME card ordinarily carried on the user-defined conductors of the P2 connector may be incompatible with VXI system uses of those conductors.

Another primary difference between the VME and VXI systems lies in the allocation of address space. In discussing address space herein, the lowest 65536 words of address space 0–65535 will be referred to as A16 space, since it can be addressed using 16 binary lines. Similarly, the term A24 space will be used to describe addresses from 65536 to 16,777,215, and A32 space will be used to describe addresses between 16,777,216 and 4,294,967,295.

The VME standard does not place limitations on the use of the lowest 65,536 word addresses, while the VXI standard uses this address space for a special purpose. Specifically, the A16 address space of the VXI system is divided into up to 256 groups of 64 sequential addresses, each of which contains configuration information for a single VXI device in the system. These address groups form configuration registers, which are accessed by the system controller at power-up and are also used during system operation. Thus, A16 address space is not generally available for use by VXI devices. Another limitation imposed by the VXI standard is that VXI devices may use addresses in A24 space or A32 space, but not in both. A final significant difference is that, although the VME standard treats all component cards in the same manner, the VXI standard defines two classes of cards that operate differently in the system. These card types are message-based devices and register-based devices.

It will be appreciated that the increased specificity of the VXI standard renders many VME cards incompatible with VXI systems. First, signals on VME user-defined conductors may be incompatible with VXI system signals carried on those conductors. Second, any VME card that uses substantial A16 addressing for communications registers or data storage will interfere with operation of the VXI system. A VME card that uses both A24 and A32 addresses will be incompatible with the VXI standard. A VME card will not generally include a block of configuration registers conforming to VXI requirements. Finally, VME cards do not know whether they are message-based or register-based devices according to the VXI standard. Therefore, it is difficult for a VME card to interact with connected devices in a VXI environment.

If VME cards are used with a VXI system, the system must be configured carefully around the VME card since the VME cards may use addresses that would interfere with the configuration registers. Therefore, installing VME cards directly in a VXI bus system requires careful planning and manual configuration of the entire system to prevent addressing conflicts Since there are an abundance of cards available for VME systems, it would be useful to develop a method by which these VME cards could be used in a VXI environment without the need for manual configuration and the reduced flexibility resulting therefrom.

SUMMARY OF THE INVENTION

Therefore, it is a general object of the present invention to provide a novel system and method for adapting cards according to one system type for use with another system type.

Another general object of the present invention is to provide a novel system and method for adapting a VME card for operational use in a VXI system.

It is an object of the present invention to provide a novel system that includes grouped special purpose registers required by a system to define a unit in the system and mounted on an adapter board so that a device lacking the special purpose registers can operate with the system.

It is a further object of the present invention to provide a novel system that provides a plurality of these grouped special purpose registers on the adapter board.

It is an object of the present invention to provide a novel VME to VXI adapter board that provides registers for a VME card, allowing the card to act as both a message-based and a register-based device in the VXI system.

Another object of the present invention is to provide a novel adapter board that remaps the addresses of cards that do not conform to the requirements of a system so that the memory addresses used do not conflict with system requirements.

It is another object of the present invention to provide a novel adapter board that remaps card addresses by assigning the card addresses used to one of a plurality of system units residing on the adapter board, each of which may have a differing address offset.

A further object of the present invention is to provide a novel adapter board that prevents the transmission of user-defined signals from a nonconforming card to a standardized bus system.

Another object of the present invention is to provide a novel adapter board that makes user-defined signals generated by a card that does not conform to a system bus standard available to other devices without routing these signals through the system bus.

Yet another object of the present invention is to provide a novel adapter board that selectively modifies and transmits interrupt and interrupt control signals between a standardized system bus and a card that does not conform to the bus standard.

It is another object of the present invention to provide a novel adapter board that permits a card which does not conform to a bus specification to act as master of a bus conforming to the bus specification.

In accordance with these objects and others that will be apparent, the present invention provides a method and device for adapting a VME card for use in a VXI system. The device disclosed resides on a circuit board that is plugged into the VXI bus, and the VME card is plugged into the device's circuit board which is provided with appropriate connectors. The device provides one or more sets of VXI configuration registers, so that the device appears to the VXI system to be one or more valid VXI units. Each region of addresses normally used by the VME card is assigned to one of the simulated VXI units, and the device modifies incoming VXI addresses directed to each region so that the VME card responds to the VXI address.

In a preferred embodiment, the VXI units simulated by the device include one message-based device and one register-based device, so that both capabilities are available to the VME card.

The device buffers signals passing between the VME card and the VXI bus, generating delays and timing signals to produce proper operation of all system components. The device provides bidirectional communication between the VME card and the VXI bus, so that the VME card can be the VXI bus master, or the VXI system controller/resource manager. The registers of the device can be configured manually by the user or dynamically by the VXI resource manager. In particular, the VXI resource manager can dynamically allocate address blocks to the simulated VXI units representing the VME card, permitting the system and device to operate in full conformance with the VXI specification.

The device disclosed also inhibits the transmission of VME user-defined signals from the VME card to the VXI bus, where these signals might interfere with bus operation. VME user defined signal lines are taken out to a connector on the adapter board containing the device of the present invention. Other devices requiring access to the user-defined signals can be cabled directly to this connector.

BRIEF DESCRIPTION OF THE DRAWINGS

FIG. 2 is a block diagram of the adapter system of the present invention.

FIGS. 4A1, 4A2, 4B1-B3, 4C1, 4C2, 4D, 4E1, 4E2, 4F1, 4F2, 4G1, 4G2, 4H1, 4H2, 4I1, and 4I2 are a schematic diagram of the adapter board of the present invention.

DETAILED DESCRIPTION OF A PREFERRED EMBODIMENT

Referring first to Figure the problems of connecting VME compatible cards to a VXI backplane are overcome in the preferred embodiment by providing an adapter board 2 that can be connected between a VXI backplane 4 and a VME-compatible card 6. The adapter board 2 provides circuits implementing the VME-VXI adapter system and method of the present invention which is shown in block diagram form in FIG. 2 and in detailed schematic form in FIGS. 4a through 4i.

Figure 1:
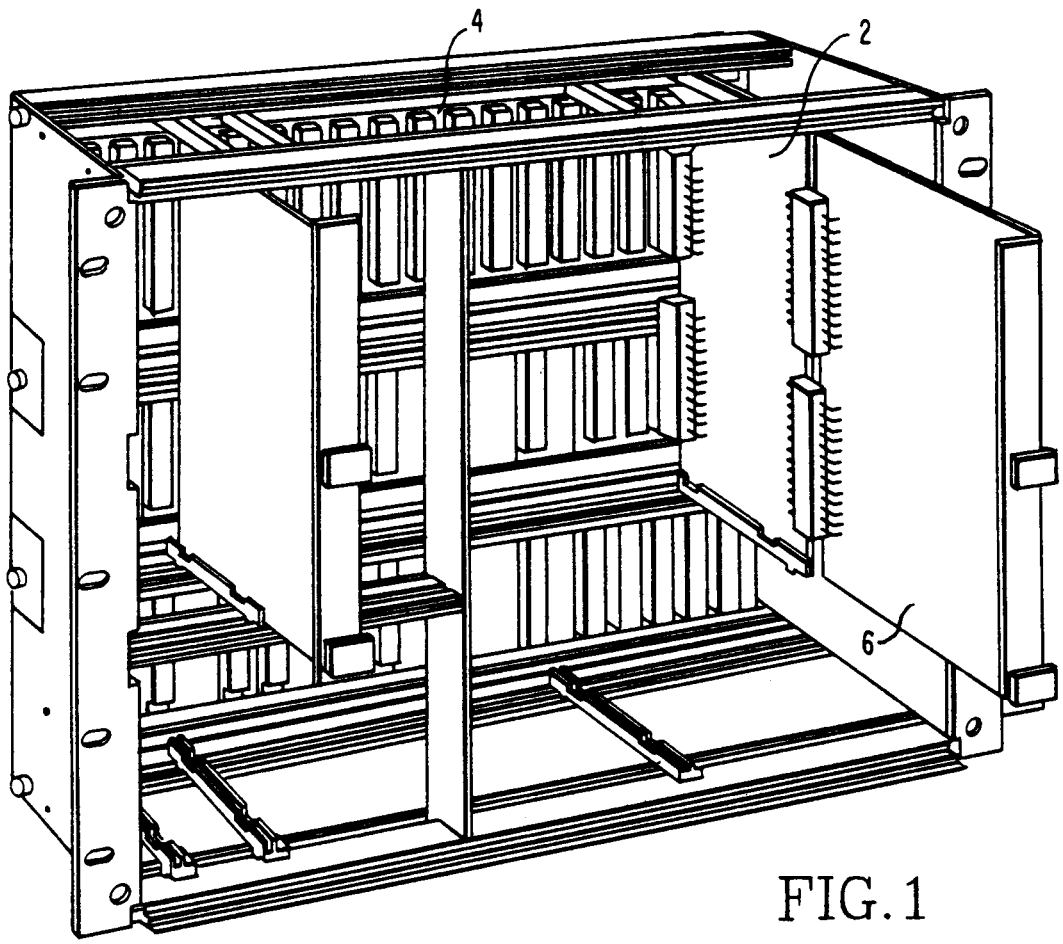
FIG. 1 is an assembly drawing showing the adapter board of the present invention installed between a VXI backplane and a VME-standard card.

As shown in FIG. 2, the adapter board 2 provides an interface between a VXI bus 8 provided in the VXI backplane 4 (shown in FIG. 1) and the VME card 6. This diagram shows the primary operative connections between components of the adapter board 2. Data transfers between the components of adapter board 2 are controlled by programmable array logic units. The operation of these units will be described in detail with reference to FIGS. 4a through 4i. First, however, the overall functions of the components shown in FIG. 2 will be described in detail.

Clock transceiver 10 accepts clock signals from the VXI bus 8 and makes these clock signals available to the components of the adapter board 2. The signals provided to adapter board 2 preferably include a VME standard SYSCLK signal, which is an independent, fixed frequency, 16 MHz, 50 percent duty cycle signal, and a BCLR signal. The transceiver 10 is preferably equipped with a jumper that can be activated by the user to permit the VME card 6 to transmit the VXI bus SYSCLK and BCLR signals. Clock circuitry 11 receives an external clock signal and converts the signal to clock signals at frequencies useful to the adapter board 2 or the VME card 6. As shown, the clock circuitry 11 preferably receives a 10 Mhz signal and generates 10 Mhz and 100 Mhz clock signals Data transceivers 12 are connected between the data lines of VXI bus 8 and the VME card 6. These data transceivers 12 are also connected to VXI configuration and message-based registers 14 for transmitting data thereto and receiving data therefrom The data transceivers 12 are preferably bidirectional data latches that are controlled by a programmable array logic unit (described in detail later) The data transceivers 12 latch the data from the VXI data bus and put it onto the adapter board 2 or VME card 6 on the rising edge of the VXI standard DSWORD signal. The direction of operation of the transceivers is determined by the type of cycle being performed (read or write). The transceivers are enabled when the circuitry of adapter card 2 transmits data onto the VXI bus 8, or when the adapter card 2 senses that the VME board 6 is going to transmit data onto the VXI bus 8.

VXI configuration and message-based registers 14 are designed in accordance with the VXI specification. The form of the configuration and message-base registers is specified completely in the VXI specification cited previously. However, a brief description will be provided here.

The configuration and message-based registers 14 are used to hold and pass information in A16 address space. Table 1 shows the registers included in the VXI specification for configuration and message-based registers 14, along with their respective address offsets from the base of the 64-address configuration block.

TABLE 1

REGISTER MAP

| | OFFSET | REGISTER |
|---|---|---|
| | 16 | A32 POINTER LOW |
| | 14 | A32 POINTER HIGH |
| Message-based | 12 | A24 POINTER LOW |
| devices only | 10 | A24 POINTER HIGH |
| | 0E | DATA LOW |
| | 0C | DATA HIGH |
| | 0A | RESPONSE/DATA EXTENDED |
| | 08 | PROTOCOL/SIGNAL REGISTER |
| Message- and | 06 | OFFSET REGISTER |
| Register- | 04 | STATUS/CONTROL REGISTER |
| based devices | 02 | DEVICE TYPE |
| | 00 | ID REGISTER |

The Registers listed in Table 1 are defined as follows:

ID REGISTER: A read of this 16 bit register provides information about the device's configuration. The two highest order bits in the ID register define a device class as follows:

| Value | Class |
|---|---|
| 00 | Memory |
| 01 | Custom |
| 10 | Message Based |
| 11 | Register Based |

There are two general classes of devices in a XVI system: message-based and register-based. Register-based devices are controlled by writing to specific register addresses and are generally less sophisticated than message-based devices. A typical register-based device might be an I/O control module. Message-based devices are generally more sophisticated, and may be capable of controlling the VXI bus. A typical message-based device is a computer residing on a VXI board. The next two bits in the ID register define the address space used by the VXI device as follows:

| Value | Mode |
|---|---|
| 00 | A16/A24 |
| 01 | A16/A32 |
| 10 | RESERVED |
| 11 | A16 Only |

The 12 lowest-order bits in the ID register are a manufacturer ID number assigned by the VXIbus Consortium. In the adapter board 2 of the present invention, the ID register is preferably implemented as a series of dual-inline-package (DIP) switches or jumpers so that the end user can readily configure the adapter board 2 according to the characteristics of the VME card 6.

DEVICE TYPE: This 16 bit register contains a device dependent type identifier. The four highest-order bits in this register represents the number of A24 or A32 memory addresses required by the device, as follows: The 4 bits contain a binary number m, which is between 0 and 15 decimal. The required memory usage is defined as $256*a * 2*(23-m)$, where a is the value of the Address Space field in the ID register. The equation gives the number of A24 or A32 addresses resident on the device. The 12 lowest-order bits in this register are a model code. This field contains a unique card identifier which is defined by the manufacturer. In the case of an A16 only device, the field occupies all 16 bits of the Device Type register. The four highest-order bits of the device type register are preferably implemented using dip switches so that the end user can readily configure the register to reflect the memory requirements of the VME card 6. The 12 lowest order bits may be hard wired, implemented as DIP switches, or may be created using read-only memory devices or read/write memory devices such as flip flops.

STATUS REGISTER: This register provides information about the device's status. The register has 16 bits, which will be referred to as bits 0-15, with bit 0 being the lowest order bit. Bit 15 indicates whether the A24 or A32 space is active. A one in this field indicates that the A24 or A32 address area can be accessed. This bit is not needed if the device uses only A16 address space. Bit 14 is the MODID indicator. A one in this field indicates that the device is not selected via the P2 MODID line. A zero indicates that the device is selected by a high state on the P2 MODID line. Bit 3 is set by the device during an extended self test. Bit 2 is the self-test passed indicator. A zero in this field indicates that the device is either executing or has failed its selftest. A one indicates that the device has successfully completed a selftest. Bits 4-13 and bits 0-1 are device dependent. The status register is preferably implemented using read/write storage devices such as flip flops, random access memory, or data latches.

CONTROL REGISTER: A write to this register causes specific actions to be executed by the device. The highest order bit of this register is an A24/A32 enable bit. A one in this field enables access to the device's A24 or A32 VMEbus registers. This bit stays low for selftest of the interface. The lowest order bit is a reset bit. A one in this field forces the device into a reset state. The second-to-lowest order bit is a SYSFAIL inhibit bit. A one in this field disables the device from driving the SYSFAIL line. The remaining bits in the register are device dependent. The control register is preferably implemented using read/write storage devices.

OFFSET REGISTER This register is used to modify the addressing used by the device for A24 or A32 address space. This 16-bit read/write register defines the base address of the device's operational space. If the VME card 6 requires only a few address locations, the entire device may operate within the configuration and message-based registers 14 using the device dependent registers to transmit and receive data signals. If the VME card 6 requires a large number of address locations, the additional locations must be remapped to either A24 or A32 address space to conform to the VXI specification. The VXI specification further provides that the resource manager of the VXI system can dynamically configure the memory allocations of the devices in the system. In the present invention, the offset register is implemented as a read/write memory device accessible both by the VXI system through the VXI bus 8 and by the addressing systems of the adapter board 2. Thus, the base address of a group of device addresses that have been mapped into A24 or A32 space can be programmed via the offset register during the system resource manager's automatic configuration of the VXI configuration and message-based registers 14.

PROTOCOL/SIGNAL REGISTER: This register is used to pass an interrupt status and/or ID word to the VXI system's CPU board. The lower eight bits of this register contains the setting of the board's place in A16 address space. The upper eight bits of this register is used to define why an interrupt occurred. DIP switches are preferably provided for the lower eight bits of the register to provide a default setting for the VXI device's base A16 address. However, dynamic configuration of the VXI device's A16 address by the VXI system resource manager may also be desired. Therefore, the DIP switches are used as inputs to a read/write memory register, and other inputs to the register are provided in case dynamic configuration is desired. The upper eight bits of the register are implemented using read/write memory devices and can thus be modified in accordance with signals from VME card 6 to indicate the cause of any interrupt generated.

DEVICE DEPENDENT REGISTERS: These registers are defined by the design of VME card 6. For example, in a register-based device, these registers might be the primary means by which the device receives commands from or provides information to other VXI cards in the system. In a message-based device, these registers will include communications registers that inform the message-based device that communication with the message-based device is desired.

It is a feature of the present invention that two sets of VXI configuration registers 14 according to the scheme just described are provided on adapter board 2. To minimize decoding hardware requirements, the two devices on adapter board 2 are "address blocked" as defined in the VXI specification and thus use contiguous logical addresses. To the VXI system, the unit comprising adapter board 2 and VME card 6 will appear to be two sequentially-mapped VXI devices. Of these two configuration registers 14, the first will preferably be set up to be a VXI message-based device, and the second will be set up to be a VXI register-based device. It would also be possible to provide two message-based devices or more than two total devices having any desired configuration. However, it has been found that only one device with message-based capability is normally required to allow full operation of the VME card 6 in a VXI system. Preferably, two devices, one of each type, are provided as stated previously. Jumpers are provided to convert the message-based device to another register-based device in cases where the VME card 6 is a purely register-type device so that there is no need for message-based communications capability.

The provision of two sets of configuration registers on adapter board 2 and the particular configuration thereof combine uniquely with other features of the present invention to permit a VME card to operate normally in a VXI environment. The dual registers permit elements of the VME card 6 to be mapped either to a message-based device or to a register-based device, as desired. Also, the availability of two VXI devices allows a VME card 6 that uses A16 address space and either A24 or A32 address space to function in the VXI system. The adapter board 2 can be set up so that the A16 addresses of the VME card are assigned to the second of the two VXI devices (the register-based device), wherein they are remapped to either A24 or A32 address space. The A24 or A32 addresses of the VME card 6 are assigned to the first VXI device (the selectable message- or register-based device). Another advantage of providing two sets of configuration registers on the adapter board 2 is that a VME card 6 with a multi-processor configuration can be installed in the VXI system so that a plurality of the processors will have direct access to the VXI bus.

Of course, registers for a third VXI device can be provided in the configuration registers 14 of the adapter board 2, in which case a VME card using all three address regions (A16, A24, and A32) could be made to function in a VXI system. The A24 addresses would be assigned to the first of the three devices and would remain mapped in A24 space, although they might be dynamically remapped by the VXI resource manager. The A16 addresses would be assigned to the second of the three devices and remapped into A24 or A32 space. The A32 addresses would assigned to the third device and would remain mapped in A32 space, likewise being dynamically remappable within that space by the VXI resource manager. However, VME cards generally will not use both A24 and A32 space in addition to A16 space, so the most cost-effective, preferred embodiment is the embodiment having two VXI devices, one of each type, as described previously.

As part of the configuration and message-based registers 14, there are also provided location monitors for the data and signal registers specified in the VXI standards. When a location monitor senses an access to its location, an interrupt is sent to the VME card 6. The interrupt level used is preferably jumper-selectable.

The VXI configuration and message-based registers 14 are connected to the module identification (MODID) lines of the VXI bus 8 for transmitting configuration information relating to the combined adapter board 2 and VME card 6.

Signals to and from the address lines of VXI bus 8 are transmitted by input address buffer 16. The input address buffer 16 provides incoming addressing signals (from the VXI address bus of VXI bus 8) to the VXI configuration and message-based registers 14, to an address modifier section 18, and to a local address buffer 20 via a delay section 22. The signals that pass through delay section 22 are the AS, DS0, and DS1 signals which are the VXI bus address and data strobes. The delaying action of delay section 22 is imposed on these strobe signals to provide time for the address to be modified as necessary by the circuits of adapter board 2 and thereafter to be transmitted to the VME card 6. Also, during transfers from the VXI bus to and from the VXI configuration and message-based registers 14, the address and data strobes AS, DS0, and DS1 are blocked from the VME card 6 to prevent undesired accesses.

Figure 3:
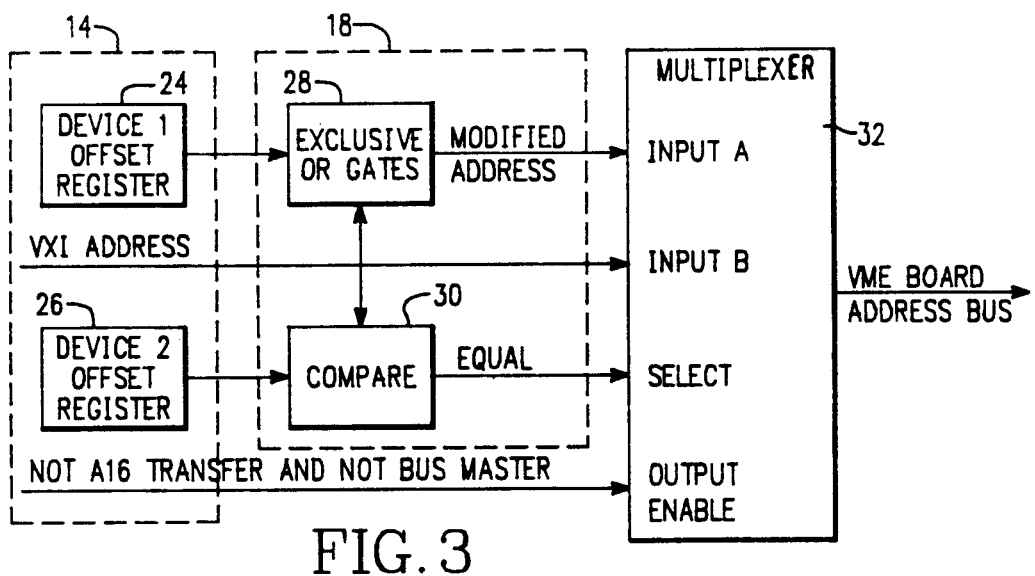
FIG. 3 is a diagram showing the modification of the input address by the system of the present invention to render the address compatible with a VME-design card.

The operation of address modifier section 18 is shown in detail in FIG. 3. The presence of address modifier section 18 allows remapping of the addresses responded to by the VME card 6 to meet the requirements of a VXI system. In the drawing of FIG. 3, the first VXI device (device 1) has associated with it the A24 or A32 space of the VME card 6. The second VXI device (device 2) has associated with it the A16 addresses used by VME card 6.

As shown in FIG. 3, the address modifier section 18 receives offset values from a first device offset register 24 and a second device offset register 26 which are contained in VXI configuration and message-based registers 14 as described previously. The address modifier section 18 also receives as an input the VXI address from the VXI bus 8.

Address modification section 18 comprises exclusive-or gates 28 and compare section 30. The compare section 30 compares the contents of the appropriate offset register with the appropriate high-order bits of the VXI address. The bits compared are determined by the address space which was selected. If the VXI address bits match the corresponding offset register contents, the compare section 30 activates its output to select input B to the multiplexer 32 of local address buffer 20, which results in transfer to the VME card 6 of the unmodified address bits from VXI address lines A1 through A15. If the compare section 30 does not determine that the VXI address bits match the corresponding offset register contents, the exclusive-or gates 28 operate to subtract the offset value contained in the appropriate offset register 24 or 26 from the most significant bits of the VXI address, producing a modified address (input A). Then, input A will be selected as the input to the multiplexer 32 and will therefore be transmitted to the VME card 6. For example, if the "VXI device" of adapter board 2 is assigned a memory block beginning at 1100 0000 hexadecimal (H) and the VME card's memory is set to respond to addresses beginning at 0000 0000 H, the offset register will be loaded by the VXI system controller with 1100 H. The exclusive-or gates 28 will exclusive-or the high order bits of the VXI address (1100 H) with the offset register contents (1100 H) to produce 0000 H. The value 0000 H, when substituted for the high order bits of the VXI address, will cause the memory on VME card 6 beginning at 0000 0000 H to respond to the address received.

The outputs of address modifier section 18 enter the multiplexer 32 of local address buffer 20. This multiplexer 32 is used since, depending on which VXI device is accessed by the VXI system, the VXI will either be passed through unchanged or will be modified in different ways depending on the device offsets stored in device offset registers 24 and 26. The multiplexer 32 of local address buffer 20 has its output enabled only when the VXI bus is not transferring data to the A16 region of the adapter board 2 (i.e. VXI configuration and message based registers 14) and when the VME card 6 is not acting as the master of VXI bus 8 through the adapter board 2.

The VME card 6 can operate through the adapter board 2 to act as the master of the VXI bus. Referring again to FIG. 2, the adapter board 2 includes control bus direction circuitry 36 which responds to signals from the VXI bus 8 and VME card 6 and allows or disallows the outgoing transmission of a plurality of signals from the VME card 6 to the VXI bus 8. The control bus direction circuitry 36 determines when the VME card 6 is the master of VXI bus 8 by monitoring the VXI bus BBSY signal, which appears as external busy signal EXTBBSY after passing through buffer 38, and by monitoring the busy signal INTBBSY generated by VME card 6. When the INTBBSY signal is active and the EXTBBSY signal is inactive, the VME card 6 is considered to be the bus master.

When the VME card 6 is master of VXI bus 8, the control bus direction circuitry 36 performs several functions. A master address buffer 34 is enabled to receive addresses from the VME card 6. The control bus direction circuitry 36 allows the VME card 6 to drive VXI bus control signals, including the BBSY signal, through OC transceiver 40. The control bus direction circuitry 36 also allows VME card 6 to drive the VXI bus 8 LWORD and WRITE signals through control signal transceiver 42. The control bus direction circuitry 36 further enables reception of data acknowledge signal DTACK by the VME card 6. The DTACK signal is generated by slave units on the VXI bus 8 to inform the master (VME card 6) that data has been received on a write operation or placed on the bus during a read operation. Since the VME card 6 is the bus master and will not generate DTACK signals, the control bus direction circuitry 36 also disables OC buffer 46 from transmitting DTACK signals to the VXI bus 8.

When the VME card 6 is not the master of VXI bus 8, the control bus direction circuitry 36 operates to allow transmission of DTACK signals generated by VME card 6 to the VXI bus 8 through OC buffer 46. These DTACK signals from VME card 6 are first delayed slightly by delay section 48 to allow time for the adapter card 2 to set up the VXI data bus of VXI bus 8 using data transceivers 12, in cases where data is to be output to VXI bus 8 by VME card 6.

The SYSRESET line 50 provides a reset signal from VXI bus 8 to VME card 6 and is connected directly between VME card 6 and VXI bus 8.

The ACFAIL and SYSFAIL lines of VXI bus 8 are connected to the VME board through OC buffer 52 which is controlled by drive control 54. The VME card 6 will generally be allowed to receive externally generated ACFAIL and SYSFAIL signals, but may be inhibited from generating these signals depending on the programming of the control register as described previously.

Both the VME and the VXI standards provide several interrupt request lines and specify a series of signals for causing and acknowledging an interrupt. In general, the interfacing scheme of the present invention allows each interrupt line of the VME card 6 to be selectively connected as an output to the VXI bus using jumpers. Similarly, each interrupt line of the VXI bus 8 can be selectively connected as an input to the VME card 6 using jumpers.

The IACK signal of the VME card 6 will be referred to as the LOCALIACK signal to distinguish it from the IACK signal of the VXI bus 8. The LOCALIACK signal and the IRQ signal of the VME card 6 are connected to OC buffer 58 for transmission to the VXI bus 8. The IRQ and IACK signal lines of the VXI bus 8 are connected through OC buffer 56 to the LOCALIACK and IRQ lines of the VME card 6. A conversion adapter 60 responds to the LOCALIACK signal to control the operation of bus control input section 62 and bus control output section 64 respectively.

Bus control input section 62 receives the BG0IN through BG3IN and IACKIN signals from VXI bus 8, transmitting the BG0IN-BG3IN- signals to VME card 6 and transmitting the IACKIN signal to conversion adapter 60. Bus control output section 64 receives the BG0OUT through BG3OUT signals from VME card 6 and receives the IACKOUT signal from conversion adapter 60. The bus control output section 64 then transmits all these signals to the VXI bus 8.

The numerous pins of the P2 connector on VME card 6 that are allocated to carry user-defined signals in a VME system are not connected by the adapter board 2 to the VXI bus 8. As explained previously, these pins lie primarily in the two outside pin rows of the VME P2 connector. Any user-defined signals generated on these pins by the VME card 6, if transmitted to the VXI bus 8, might conflict with the signals on the VXI bus 8, since the VXI standard uses these lines for other purposes. The user-defined pins of the VME card are instead carried from the P2 connector of adapter board 2 that mates with VME card 6 to an auxiliary connector provided on adapter board 2. This auxiliary connector thus allows access to the VME user-defined pins of VME card 6. If it is desired to use a family of VME cards that communicate with each other in a proprietary manner over the VME user-defined lines in a VXI system, the VME cards could be installed in the VXI system using the adapter boards of the present invention, and the auxiliary connectors of these adapter boards could be cabled together to provide an auxiliary, user-defined bus. In this way, the adapter board 2 of the present invention allows VME cards that operate with user-defined lines to be used in a VXI system.

Referring now to FIGS. 4a through 4i, a schematic diagram comprising a preferred embodiment of the adapter board 2 is shown in detail. While the drawing sheets of FIGS. 4a through 4i are physically separate, they in fact constitute a single drawing wherein similarly labeled electrical communication lines shown on any one sheet are connected to those lines similarly labeled on the other drawing sheets. Also, those skilled in the art will recognize that the VME and VXI specifications incorporated herein by reference explain the functions of those signal lines in the diagrams that are labeled according to the VME and VXI signal names. In the drawings, pullup connections (connections to a +5 VDC power source) are shown by the designation PU.

In FIGS. 4a through 4i, terminals residing in electrical connectors attached to the adapter board 2 of the present invention are marked with OP1, OP2, OJ1, OJ2, or OJ3 to indicate the connector containing the terminal. The OP1 connector is the P1 connector mating with the VXI backplane 4. The OP2 connector is the P2 connector mating with the VXI backplane 4. The OJ1 connector is the P1 connector which receives the P1 connector of the VME card 6. The OJ2 connector is the P2 connector which receives the P2 connector of the VME card 6. Finally, the OJ3 connector is the auxiliary connector to which the user-defined lines of the VME card 6 are connected as described previously. The terminals in the diagrams are also marked with a terminal number A01 through C32. The terminal numbers A01–32, B01–32, and C01–32 define the terminal position within the standard VME and VXI connectors. A, B, and C indicate the row of the terminal position and the numbers 01 through 32 indicating the position of the terminal within that row.

Integrated circuit devices are shown in the drawings as rectangles and are labeled with a model number. Pin numbers for the connections indicated are also provided. Those skilled in the art will recognize that similarly-functioning devices of other model types or manufacture could be substituted for the devices shown in the preferred embodiment of FIGS. 4a through 4i. Table 2 below lists manufacturers for each of the device model numbers used.

TABLE 2

ADAPTER BOARD HARDWARE

| MODEL | DESCRIPTION | MANU-FACTURER |
|---|---|---|
| PALC22V10L-25WC | Programmable PAL | Cypress Semi. |
| SN-74ALS86-N | XOR Gate | Texas Inst. |
| KS-74AHCT154-N | Decoder | Samsung |
| IDT-7200-S35-TC | FIFO register | IDT |
| SN-74ALS832A-N | HEX OR | Texas Inst. |
| IDT-6116SA30-TP | 2k × 8 RAM | IDT |
| LPSLDM-250 | Delay line | Engcompco. |
| MPSLDL-12 | Delay Line | Engcompco. |
| 74ACT257PC | multiplexer | Fairchild Ind. |
| SN-74AS08-N | AND gate | Texas Inst. |
| IDT-74FCT521-BP | Comparator | IDT |
| SN-74ALS647-1NT | Transceiver | Texas Inst. |
| SN-74ALS641A-1N | Transceiver | Texas Inst. |
| IDT-74FCT645-P | Transceiver | IDT |
| IDT-74FCT646-AP | Transceiver | IDT |
| IDT-74FCT240-P | Inv. Buffer | IDT |
| SN-74ALS996-NT | Latch | Texas Inst. |
| IDT-74FCT373-AP | Trans Latch | IDT |
| IDT-74FCT374-P | Latch | IDT |
| IDT-74FCT244-AP | Octal Buffer | IDT |

The primary control of data transfers between the VXI bus 8 and the VME card 6 (as described with reference to FIG. 2) are provided by three programmable array logic devices (PALs). These PALs will be referred to as the data PAL, address PAL, and the interrupt PAL. While a total of nine PALs are used in this implementation of the invention, the other PALS will be referred to in the context of their use in functions. The contents of all PALS, in the form of logic equations, can be found in Appendix A.

The data, address, and interrupt PALs are shown in FIG. 4h. The data PAL 70 determines whether the VME board residing on the adapter is in control of the VXI bus 8 by monitoring the BUSY-signal of both buses. The data PAL 70 signals the rest of the circuitry on the adapter by asserting the MASTER-signal. Direction control for the data transceivers 12 shown in FIG. 4b is also generated by the data PAL 70.

Address PAL 72 controls the enables for address and strobe buffers. It performs this function by monitoring the type of transfer taking place, bus mastership, and the output of the compare section 30.

The interrupt PAL 74 is part of a larger conversion adapter section 60 depicted in FIGS. 4c and 4h that monitors off-board access to the adapter message based device registers that are used for communication and memory sharing. The interrupt circuitry output can be routed to any of the interrupt lines of the VME card 6 through dip switch configuration.

FIG. 4a shows the input address latch 16 used to receive the VXI bus address and the modified address latch 66 which can be used to read the output of the address modifier circuit 28 from FIG. 4f. The address is fed to the VME card 6 through the modified address buffer 20. The VME card 6 is enabled to drive the address lines of the VXI bus 8 through the output address buffer 34 shown in FIG. 4b.

The actual message based and register based circuitry added by the adapter consists of decoding hardware 76 shown in FIG. 4c. The base address of this circuitry is configurable by either the dip switches or by a write access to the logical address register. This decoding circuitry provides read and write strobes to the VXI configuration registers 14. The hardware containing these registers is shown in the figures as follows:

ID REGISTER: FIG. 4g. The ID register is a read only register that is used for both devices on the adapter. In both cases, the register returns the manufacturer's ID, but other configuration information such as which address space is being used is different for each of the devices and is determined by dip switch settings that also control the operation of the rest of the adapter circuitry.

DEVICE TYPE REGISTER: FIG. 4g. This register is also a shared register. The register returns the same model code independent of the device accessed, but returns a different required memory code for each device.

STATUS/CONTROL REGISTER: FIG. 4g. A separate control register exists for each device on the adapter, but the status register used for readback of control and status information is shared by the devices.

Figure 4D:
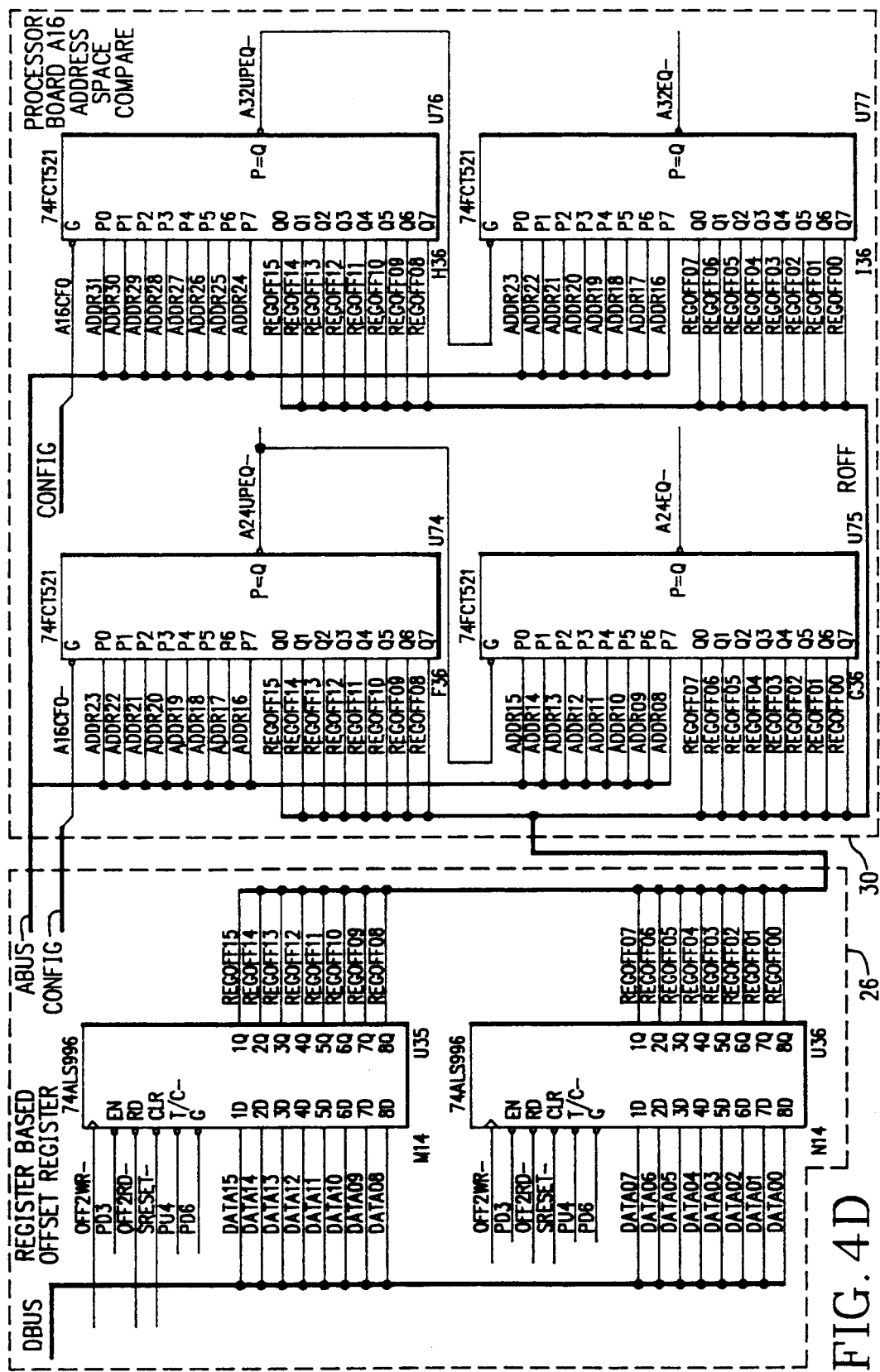

OFFSET REGISTER: Separate registers exist for the devices. FIG. 4e shows the message based offset register 24 feeding into a modifier multiplexer 78. The messaged based offset register contains a value to be exclusive or'd with the VXI address, and the modifier multiplexer determines which address lines will be modified depending on the address space the VME board is mapped into. The register based offset register 26 is shown in FIG. 4d feeding the compare section 30. The compare section 30 compares the VXI address to a A24 or an A32 address depending on dip switch configuration.

The signal, protocol, and response registers are implemented in accordance with the VXI bus specification as shown in FIG. 4i. Also in FIG. 4i are the data high, data low, A24 pointer high, A24 pointer low, A32 pointer high, and A32 poniter low registers. These registers are implemented in 6116 RAMs and are used for communications and passing parameters.

The interface card 2 of the present invention is preferably provided with features providing test capability. This testing uses the components of the adapter board 2 and is preferably controlled by signals from devices connected to the VXI bus 8 or VME card 6. Of course, processing control capability could also be provided on the adapter board 2 to control testing operations.

Testing preferably begins in the A16 address space. The VXIbus required registers will be read and verified by comparison to known values. The Control and Offset Registers will then be written to and read from for verification. Once this is done the Control Register will be set up to begin testing address lines.

The address lines may be tested by wrapping them back around onto the data bus using the selftest address latch 66 shown in FIG. 4a. The STEST signal, and either the STESTUADDR or STESTLADDR signals of the Control Register, are then set. An address is written through the selftest address latch to the data lines of the adapter board 2 and is then read using the save address. In the embodiment shown, only 16 address lines can be checked at a time because the 32 bit address bus is split into two and wrapped back on the lower 16 data lines.

The data lines may be tested by wrapping them around inside the Data Latches. This is done by setting the STEST and STESTDATA bits of the Control Register and writing to an address with a known data value. The timing of the wrap-around is controlled by the data PAL. The written value is then verified by reading it back, using the same address.

Next, the interrupt circuitry can be tested. The STEST and STESTIRQ bits in the Control Register are set, starting the interrupt cycle. The status/ID value is then read to verify proper operation of the interrupt circuitry.

STATEMENT OF INDUSTRIAL APPLICABILITY

The present invention is a system and method of adapting computer cards for full operation in a standard digital communications bus even though these cards were originally designed to operate in a different type of digital communications bus.

```
module COMPARATOR flag '-xM'
title  'ADDRESS COMPARATOR PAL (412420H01) FOR VME/VXI CONVERSION ADAPTER';

COMPARE     DEVICE     'P22V10';

SA16,ADDR15,ADDR14,ADDR13,ADDR12,ADDR11      PIN 1,2,3,4,5,6;
   ADDR10,ADDR09,ADDR08,ADDR07,TSTATE,MODID     PIN 7,8,9,10,11,13;
   LA1,LA2,LA3,LA4,MSEL,MATCH,BDCODE            PIN 14,15,16,17,18,19,20;
   LA5,LA6,LA7                                  PIN 21,22,23;

OUTPUTS = [MSEL,BDCODE,MATCH];
   ADDRESS = [ADDR13,ADDR12,ADDR11,ADDR10,ADDR09,ADDR08,ADDR07];
   LA = [LA7,LA6,LA5,LA4,LA3,LA2,LA1];
   Z = .Z.;
   MSEL,BDCODE,MATCH                            ISTYPE  'POS,COM';

FF = ADDR13 & ADDR12 & ADDR11 & ADDR10 &
        ADDR09 & ADDR08 & ADDR07;

equations

ENABLE OUTPUTS = TSTATE;

MATCH = ADDR13 & !LA7 # !ADDR13 & LA7
         # ADDR12 & !LA6 # !ADDR12 & LA6
```

```
                # ADDR11 & !LA5 # !ADDR11 & LA5
                # ADDR10 & !LA4 # !ADDR10 & LA4
                # ADDR09 & !LA3 # !ADDR09 & LA3
                # ADDR08 & !LA2 # !ADDR08 & LA2
                # ADDR07 & !LA1 # !ADDR07 & LA1;

BDCODE = !MATCH & !SA16 & FF & ADDR15 & ADDR14;

MSEL   = !MATCH & !MODID & !SA16 & FF & ADDR15 & ADDR14;

end     COMPARATOR module  REGISTER_SELECT_CONTROL flag '-x8'
title   'REGISTER PAL (412420B02) FOR VME/VXI CONVERSION ADAPTER';

REGSLPAL        DEVICE          'P22V10';

RESET                                           NODE 25;
        DSWORD,ADDR06,ADDR05,ADDR04                     PIN 1,4,5,6;
        AS,WRITE,BDCODE,MSEL,PU                         PIN 7,8,9,10,11;
        DTACK,WRSTB,RDSTB,BDEN,A16REG                   PIN 14,17,18,19,20;
        PTR,MESREG                                      PIN 22,23;

OUTPUTS = [MESREG,PTR,A16REG,BDEN,RDSTB,WRSTB];

MESREG,PTR,A16REG               ISTYPE  'NEG,REG';
        BDEN,RDSTB,WRSTB                ISTYPE  'NEG,COM';

Z,X = .Z.,.X.;

equations

ENABLE OUTPUTS = PU;

RESET = AS;

!MESREG  := (BDCODE & !ADDR06 # MSEL & ADDR06) & !ADDR04;

!PTR     := (BDCODE & !ADDR06 # MSEL & ADDR06) & !ADDR05 & ADDR04;

!A16REG  := BDCODE & ADDR06 & !ADDR05 & !ADDR04;

!BDEN    = (BDCODE # (MSEL & ADDR06)) & !AS;

!RDSTB   = WRITE & DSWORD;

!WRSTB   = !WRITE & DSWORD & !DTACK;

end     REGISTER_SELECT_CONTROL

MODULE  REGISTER_DECODE
title   'DECODE PAL (412420B03) FOR VME/VXI CONVERSION ADAPTER';

DECODE          DEVICE          'P22V10';

IDREG1RD,DTYPE1RD,A16REG,WRSTB,RDSTB,ADDR03     PIN 2,3,4,5,6,7;
        ADDR02,ADDR01,STAT1RD,PU                        PIN 8,9,10,11;
        STATRD,OFF2RD,OFF2WR,STAT2RD,CONT2WR            PIN 17,18,19,20,21;
        DTYPERD,IDREGRD                                 PIN 22,23;

OUTPUTS = [STATRD,STAT2RD,CONT2WR,DTYPERD,
                    IDREGRD,OFF2RD,OFF2WR];

STATRD,STAT2RD,CONT2WR,DTYPERD          ISTYPE  'NEG,COM';
        IDREGRD,OFF2RD,OFF2WR                   ISTYPE  'NEG,COM';

equations
```

```
    ENABLE OUTPUTS = PU;

!IDREGRD  = !A16REG & !ADDR03 & !ADDR02 & !ADDR01 & !RDSTB
              # !IDREG1RD;

!DTYPERD  = !A16REG & !ADDR03 & !ADDR02 &  ADDR01 & !RDSTB
              # !DTYPE1RD;

!CONT2WR  = !A16REG & !ADDR03 &  ADDR02 & !ADDR01 & !WRSTB;

!STAT2RD  = !A16REG & !ADDR03 &  ADDR02 & !ADDR01 & !RDSTB;

!STATRD   = !STAT2RD # !STAT1RD;

!OFF2WR   = !A16REG & !ADDR03 &  ADDR02 &  ADDR01 & !WRSTB;

!OFF2RD   = !A16REG & !ADDR03 &  ADDR02 &  ADDR01 & !RDSTB;

end  REGISTER_DECODE
module  LOCATION_MONITOR_PAL
title  'LOCATION MONITOR (412420H04) PAL FOR THE VME/VXI CONVERSION ADAPTER'

LOCMON      DEVICE      'P22V10';

STEST,LARWR,SIGWR,DATHIWR,DATLOWR       PIN 1,2,3,4,5;
    DATHIRD,DATLORD,PU,PTR                  PIN 6,7,8,9;
    RDSTRB,WRSTRB,MASTER,MRESET             PIN 10,11,13,14;
    WRITE,DREGSEL,RAMEN,LDINTFIFO           PIN 15,16,17,18;
    WRRDY,RDRDY,RAMWR,RAMRD,DTACK           PIN 19,20,21,22,23;

OUTPUTS = [DREGSEL,WRRDY,RDRDY,RAMWR,RAMRD,RAMEN,LDINTFIFO];

RAMWR,RAMRD,RAMEN                       ISTYPE   'NEG,COM';
    WRRDY,RDRDY,LDINTFIFO,DREGSEL           ISTYPE   'POS,COM';

X,Z = .X.,.Z.;

equations

ENABLE OUTPUTS = PU;

!LDINTFIFO = (MASTER # STEST) & !DTACK &
                 (!LARWR # !SIGWR # !DATHIWR # !DATLOWR # !DATHIRD
                  # !DATLORD);

!RAMRD     = (!RDSTRB & !PTR) # !DATHIRD # !DATLORD;

!RAMWR     = (!WRSTRB & !PTR) # !DATHIWR # !DATLOWR;

!RAMEN     = (!RDSTRB & !PTR) # !DATHIRD # !DATLORD
                 # (!WRSTRB & !PTR) # !DATHIWR # !DATLOWR;

RDRDY      = MRESET & !MASTER & !STEST & !DATLOWR
                 # MRESET & RDRDY & ((!MASTER & !STEST) # DATLORD);

"RDRDY WILL GO HIGH WHEN THE VME BOARD WRITES INTO THE
        "DATA LOW REGISTER AND WILL STAY HIGH UNTIL THE DATA LOW
        "REGISTER IS READ BY ANOTHER BOARD, OR THE VME BOARD WHILE
        "IN THE SELFTEST MODE. A LOW ON MRESET RESETS RDRDY. WRRDY
        "OPERATES IN A SIMILAR MANNER.

WRRDY      = !MRESET
                 # MRESET & !MASTER & !STEST & !DATLORD
                 # MRESET & WRRDY & ((!MASTER & !STEST) # DATLOWR);

DREGSEL    = !MASTER & WRITE & !STEST
                 # MASTER & !WRITE
```

```
        # !MASTER & !WRITE & STEST
        # !PTR;

end    LOCATION_MONITOR_PAL
module MISCELLANEOUS
 title 'PAL (412420H05) FOR VME/VXI CONVERSION ADAPTER';

MISC       DEVICE     'P22V10';
    RESET                                           NODE 25;
    LARWR,CAUSERD,EMPTY,ENINT,OFF1WR,OFF1RD         PIN 1,2,3,4,5,6;
    SRESET,PU                                       PIN 8,9;
    MOFFSEL,MOFFRD,MOFFINITRD,LAREN,IRQ             PIN 14,15,16,17,23;

OUTPUTS = [MOFFSEL,MOFFRD,MOFFINITRD,LAREN,IRQ];

X,Z = .X.,.Z.;

LAREN                                  ISTYPE   'NEG,REG';
    MOFFSEL,MOFFRD,MOFFINITRD,IRQ          ISTYPE   'NEG,COM';

equations

RESET = !SRESET;

ENABLE OUTPUTS = PU;

!LAREN := 1;

!MOFFSEL = !OFF1WR
             # !MOFFSEL & SRESET;

!MOFFRD = !OFF1RD & !MOFFSEL;

!MOFFINITRD = !OFF1RD & MOFFSEL;

!IRQ = !EMPTY # !CAUSERD # ENINT;

test_vectors
    ([PU,OFF1WR,OFF1RD,SRESET,MOFFSEL] ->
         [MOFFSEL,MOFFINITRD,MOFFRD,LAREN,IRQ])
     [0,1,1,0,1] -> [Z,Z,Z,Z,Z];
     [1,1,1,0,1] -> [1,1,1,X,X];
     [1,1,0,1,1] -> [1,0,1,X,X];
     [1,0,1,1,1] -> [0,1,1,X,X];
     [1,1,0,1,0] -> [0,1,0,X,X];
     [1,1,1,0,0] -> [1,1,1,X,X];

end   MISCELLANEOUS
module ADDRESS_CONTROL
 title 'ADDRESS_PAL (412420H06) FOR THE VME/VXI CONVERSION ADAPTER';

ADDRPAL    DEVICE     'P22V10';

PU,BAM4,BAM5,LAM3,AS,DAS,DS0,DS1                PIN 1,2,3,4,5,6,7,8;
    A24EQ,A32EQ,EN16,EN2432,LAM5,LAM4               PIN 9,10,11,13,14,15;
    MASTER,A24UPEQ,A16REQMEM,ENDS,ENAS,SA16         PIN 16,17,18,19,20,21;
    ENA2432,ERA16                                   PIN 22,23;

ENDS,ENAS,SA16,ENA2432,ERA16           ISTYPE   'NEG,COM';

LAM5,LAM4                              ISTYPE   'POS,COM';

LAM     = [LAM4,LAM5];

OUTPUTS = [ENDS,ENAS,SA16,ENA2432,ERA16];

ADDR16 = !EN16 & (LAM3 & BAM4 & BAM5 & !A24EQ & A16REQMEM
                    # LAM3 & BAM4 & BAM5 & !A24UPEQ & !A16REQMEM
                    # LAM3 & !BAM4 & !BAM5 & !A32EQ);
```

```
    REGSEL  = ADDR16 & MASTER;

MESSEL  = !(LAM3 & !BAM4 & BAM5) & (!ADDR16 # EN16) & !EN2432 & MASTER;
equations

ENABLE OUTPUTS = PU;

ENABLE LAM     = MASTER & PU;

!SA16   = LAM3 & !BAM4 & BAM5 & !AS;

!ENA16  = REGSEL;

!ENA2432 = MESSEL;

!ENA8   = !DAS & !AS & (REGSEL # MESSEL)
            # !ENA8 & !AS;

!ENDS   = !DAS & (REGSEL # MESSEL)
            # !ENDS & (!DS0 # !DS1);

LAM4    = BAM4 & !ADDR16;

LAM5    = BAM5 & !ADDR16
            # ADDR16;

end  ADDRESS_CONTROL
module   DATA_CONTROL
title 'DATA CONTROL PAL (412420B07) FOR VME/VXI CONVERSION ADAPTER';

DATAPAL   DEVICE   'P22V10';

PU,DS0,DS1,DTACK,AS,BDEN,WRITE              PIN 1,2,3,4,5,6,7;
    ENA16,INTDS                                 PIN 9,10;
    INTBUSY,EXTBUSY                             PIN 11,13;
    DATDIR,DATEN,LDADDR,DSWORD                  PIN 17,18,19,20;
    DATACLK,MASTER                              PIN 22,23;

OUTPUTS = [DATDIR,DATEN,LDADDR,DSWORD,DATACLK,MASTER];
    X,Z = .X.,.Z.;

DATEN,DATDIR                                ISTYPE  'NEG,COM';
    DSWORD,MASTER,DATACLK,LDADDR                ISTYPE  'POS,COM,';
equations

ENABLE OUTPUTS = PU;

DSWORD  = !BDEN & (!DS0 # !DS1)
            # INTDS & (!DS0 # !DS1)
            # !MASTER & !WRITE & !ENA16 & (!DS0 # !DS1);

!DATEN  = !WRITE
            # !MASTER & WRITE;

DATDIR  = !MASTER & WRITE & (BDEN # !DTACK)
            # MASTER & !WRITE;

!MASTER = EXTBUSY & !INTBUSY
            # !MASTER & !EXTBUSY & !INTBUSY
            # !MASTER & !AS;

DATACLK = !MASTER & !WRITE & DSWORD;

LDADDR  = !AS & (!DS0 # !DS1) & !WRITE;

end  DATA_CONTROL
```

```
module INTERRUPT_CONTROL
title 'INTERRUPT PAL (412420H08) FOR THE VME/VXI CONVERSION ADAPTER'

INITPAL    DEVICE    'P22V10';

RESET                                               NODE 25;
    IRQ,IACKOUTIN,DSWORD,IACK,ADDR01,ADDR02,ADDR03      PIN 1,2,3,4,5,6,7;
    IRQLEV0,IRQLEV1,IRQLEV2,PU                          PIN 8,9,10,11;
    MRESET,INTDS,MASTER,IACKIN,IACKIND,IACKOUTOUT       PIN 13,14,15,18,19,20;
    STATID,CLRINT,SENDIRQ                               PIN 21,22,23;

OUTPUTS = [IACKIND,SENDIRQ,CLRINT,IACKOUTOUT,STATID];
    ADDR    = [ADDR03,ADDR02,ADDR01];
    IRQLEV  = [IRQLEV2,IRQLEV1,IRQLEV0];

SENDIRQ                         ISTYPE  'NEG,REG';
    CLRINT,INTDS                    ISTYPE  'POS,COM';
    IACKOUTOUT,STATID,IACKIND       ISTYPE  'NEG,COM';

INTEQUAL = (ADDR == IRQLEV) & !MASTER;

equations

ENABLE OUTPUTS = PU;

RESET = CLRINT;

!SENDIRQ := 1;

CLRINT = !STATID # !MRESET;

INTDS = INTEQUAL & !IACKOUTIN;

!IACKOUTOUT = !IACK & !IACKOUTIN & STATID & (!INTEQUAL # SENDIRQ);

!STATID = INTEQUAL & DSWORD & IRQ & !IACKOUTIN;

!IACKIND = !IACKIN;

end INTERRUPT_CONTROL

MODULE SYSTEM_CONTROL_PAL
title 'SYSTEM CONTROL PAL (412420H09) FOR THE VME/VXI CONVERSION ADAPTER';

SYS    DEVICE    'P22V10';

ISYSFAIL,ESYSFAIL,IACFAIL,EACFAIL        PIN 2,3,4,5;
    RESET,SRESET,SFINBLK,SYSFINH,PU          PIN 6,7,8,9,13;
    DRVEACF,DRVIACF,DRVESF,DRVISF            PIN 14,15,16,17;
    FAILIND,PASSED,MRESET                    PIN 18,19,20;

OUTPUTS = [MRESET,DRVEACF,DRVIACF,DRVESF,DRVISF,PASSED,FAILIND];

MRESET,DRVEACF,DRVIACF,DRVESF,DRVISF     ISTYPE 'NEG,COM';
    PASSED,FAILIND                           ISTYPE 'NEG,COM';

Z = .Z.;

equations

ENABLE OUTPUTS = PU;

!DRVEACF = !IACFAIL & DRVIACF;

!DRVIACF = !EACFAIL & DRVEACF;
```

```
!DRVESF     =  !ISYSFAIL & DRVISF;

!DRVISF     =  !ESYSFAIL & DRVESF & SFINBLK;

!MRESET     =  !SRESET # RESET;

!PASSED     =  !ISYSFAIL & DRVISF;

!FAILIND    =  !ESYSFAIL;

test_vectors
    ([PU,SFINBLK,ESYSFAIL,ISYSFAIL,DRVESF,DRVISF
        ,EACFAIL,IACFAIL,DRVEACF,DRVIACF,SRESET,RESET]
     -> [DRVESF,DRVISF,DRVEACF,DRVIACF,PASSED,MRESET,FAILIND])
    [0,1,1,0,1,1,1,0,1,1,0,0] -> [X,X,X,X,X,X,X];
    [1,1,1,0,1,1,1,0,1,1,0,0] -> [0,1,0,1,0,0,1];
    [1,1,0,1,1,1,0,1,1,1,0,1] -> [1,0,1,0,1,0,0];
    [1,0,0,1,1,1,1,1,1,1,1,0] -> [1,1,1,1,1,1,0];
    [1,1,1,1,1,1,1,1,1,1,1,1] -> [1,1,1,1,1,0,1];
    [1,1,0,1,1,0,0,1,1,0,1,0] -> [1,0,1,0,1,1,0];
    [1,0,0,1,1,0,1,1,1,0,1,0] -> [1,1,1,1,1,1,0];
    [1,1,1,1,1,0,1,1,1,0,1,0] -> [1,1,1,1,1,1,1];
    [1,1,1,0,0,1,1,0,0,1,1,0] -> [0,1,0,1,0,1,1];
    [1,1,1,1,0,1,1,1,0,1,1,0] -> [1,1,1,1,1,1,1];

end    SYSTEM_CONTROL_PAL
```

I claim:

1. A device for adapting a card conforming to the VME interface standard for use in a system with a bus conforming to the VXI interface standard, where the VXI interface standard requires that each addressable unit provides a number of special purpose registers in an address region, the device comprising a configuration register means responding to addresses in the address region and providing special purpose registers representing a plurality of addressable units, the device being operatively connected to the VME interface standard and the VXI interface standard.

2. The device of claim 1 wherein the special purpose registers provided represent two addressable units.

3. A device according to claim 1 including an address modifying means which selectively receives the addresses transmitted by the system to the card, modifies the addresses according to a programmed offset quantity, and transmits the modified addresses to the card.

4. A device according to claim 1 further including auxiliary connector means for connecting external devices to signal lines of the card which do not conform to protocols of the second bus interface standard.

5. The device of claim 1 further including interrupt control means for processing interrupt signals and selectively transmitting interrupt indications between the card and the system according to a predetermined protocol.

6. The device of claim 5 further including switch connector means for selecting the signals transmitted by the interrupt control means between the card and the system.

7. The device of claim 1 wherein at least one of the units represented by the registers of the configuration register means can be configured to be either a message-based unit or a register-based unit.

8. The device of claim 1 further including bus mastership means for enabling the card to control the system bus through the device.

9. The device of claim 1 wherein the device resides on a circuit board unit adapted for insertion between the system and the card.

10. A device for adapting a card conforming to the VME interface standard for use in a system with a bus conforming to the VXI interface standard which is related to the VME interface standard, such that the use of certain incompatible address locations which the card responds to in accordance with the VME interface standard is prohibited according to the VXI interface standard, comprising:
  a) bus connector means for connecting the device in electrical communication with the bus of the system of the VXI interface standard;
  b) board connector means for connecting the device in electrical communication with the card conforming to the VME interface standard;
  c) transmitting means connected to the bus connector means and the board connector means for transmitting information signals received from the system to the card;
  d) offset quantity means for accessing an offset quantity which may be either stored on the device or received from the system;
  e) address modification means connected to the bus connector means, board connector means, and offset quantity means for receiving form the system a compatible address conforming to the VXI interface standard, obtaining the offset quantity from the offset quantity means, and for generating a related incompatible address and transmitting said incompatible address to the card.

11. The device of claim 10 in which the address modification means generates the incompatible address by performing a logical exclusive-or operation on the compatible address and the offset quantity.

12. The device of claim 10 for use which VME and VXI interface standards in which the VME interface standard provides a group of user-defined lines in its bus and the VXI interface standard has comparably located lines which are not available for user-definition, wherein and the device includes auxiliary connector means connected to the card connector means for permitting an external electrical communication connection to at least one of the user-defined lines of the card.

13. The device of claim 12 wherein the transmitting means does not transmit electrical signals between the user-defined lines of the card and the comparably located lines of the system.

14. The device of claim 10 wherein the transmitting means also functions to transfer information signals from the card to the system.

15. The device of claim 10 further including bus mastership means for enabling the card to control the system bus through the device.

16. The device of claim 15 wherein the bus mastership means includes address transfer means for transmitting addresses from the card to the system.

17. The device of claim 15 wherein the bus mastership means includes mastership control signal generating means for generating signals indicating that the card has control of the system bus through the device.

18. The device of claim 10 wherein the device resides on an adapter board adapted to be connected between the system bus and the card.

19. A device for adapting a card conforming to a VME interface standard for use in a system conforming to a VXI interface standard which is related to the VME interface standard, the standards being such that the use of certain incompatible address locations which the card responds to in accordance with the VME interface standard is prohibited according to the VXI interface standard requires that each unit in a system conforming to the VXI interface standard provide special purpose registers residing in the incompatible address space, comprising:
 a) bus connector means for connecting the device in electrical communication with the bus of the system of the VXI interface standard;
 b) board connector means for connecting the device in electrical communication with the card conforming to the VME interface standard;
 c) transmitting means connected to the bus connector means and the board connector means for transmitting information signals received from the system to the card;
 d) offset quantity means for accessing an offset quantity which may be either stored on the device or received from the system;
 e) address modification means connected to the bus connector means, board connector means, and offset quantity means for receiving from the system a compatible address conforming to the VXI interface standard, obtaining the offset quantity from the offset quantity means, and for generating a related incompatible address and transmitting said incompatible address to the card;
 f) configuration register means responding to addresses in the said incompatible address space for providing the special purpose registers required by the VXI interface standard.

20. The device of claim 19 wherein the configuration register means includes registers defining at least two individual units according to the VXI interface standard.

21. The device of claim 20 wherein the offset quantity means accesses a distinct offset quantity dependent on the unit addressed by the system so that a differing group of card addresses is accessed when the system accesses a different one of the individual units.

22. The device of claim 20 for use with a VXI standard defining at least two classes of units, wherein at least one of the units defined by the registers of the configuration register means can be selectively configured to belong to either of the two classes of units.

23. The device of claim 21 wherein at least one of the units defined by the registers of the configuration register means can be configured to be a message-based unit or a register-based unit.

24. The device of claim 20 wherein the transmitting means also functions to transfer information signals from the card to the system.

25. The device of claim 20 further including bus mastership means for enabling the card to control the system bus through the device.

26. The device of claim 25 wherein the bus mastership means includes address transfer means for transmitting addresses from the card to the system.

27. The device of claim 25 wherein the bus mastership means includes mastership control signal generating means for generating signals indicating that the card has control of the system bus through the device.

28. The device of claim 19 further including interrupt control means connected to the bus connector means and to the board connector means for processing interrupt signals and selectively transmitting interrupt indications between the card and the system according to a predetermined protocol.

29. The device of claim 19 wherein the device resides on an adapter board adapted to be connected between the system bus and the card.

30. A device for adapting a card conforming to a VME interface standard for use in a system conforming to a VXI interface standard which is related to the VME interface standard, the standards being such that the use of certain incompatible address locations which the card responds to in accordance to the VXI interface standard, and where the VXI interface standard requires that each unit in a system conforming to the VXI interface standard provide special purpose registers residing in the incompatible address space, comprising:
 a) bus connector means for connecting the device in electrical communication with the system of the VXI interface standard;
 b) board connector means for connecting the device in electrical communication with the card conforming to the VME interface standard;
 c) transmitting means connected to the bus connector means and the board connector means for transmitting information signals received from the system to the card;
 d) configuration register means responding to addresses in the said incompatible address space for providing the special purpose registers required by the VXI interface standard and including registers defining at least two individual units addressable by the system according to the VXI interface standard;

e) offset quantity means for accessing a plurality of offset quantities depending on the identity of the unit addressed by the system, the offset quantities being either stored on the device or received from the system;

f) address modification means connected to the bus connector means, board connector means, and offset quantity means for receiving from the system a compatible address conforming to the VXI interface standard, obtaining the appropriate offset quantity from the offset quantity means, and for generating an incompatible address related to the compatible address and transmitting said incompatible address to the card to access a differing group of card addresses depending on the unit accessed by the system;

g) interrupt control means connected to the bus connector means and the board connector means for processing interrupt signals and selectively transmitting interrupt indications between the card and the system according to a predetermined protocol.

31. The device of claim 30 for use with a VXI standard defining at least two classes of units, wherein at least one of the units defined by the registers of the configuration register means can be selectively configured to belong to either of the two classes of units.

32. The device of claim 31 wherein at least one of the units defined by the registers of the configuration register means can be configured to be a message-based unit or a register-based unit.

33. A device for adapting a card conforming to a VME interface standard for use in a system with a bus conforming to a VXI interface standard which is related to the VME interface standard, where the VXI interface standard requires that each unit in a system conforming the VXI interface standard provide special purpose registers in an address region, comprising:

a) bus connector means for connecting the device in electrical communication with the system of the VXI interface standard;

b) board connector means for connecting the device in electrical communication with the card conforming to the VME interface standard;

c) transmitting means connected to the bus connector means and the board connector means for transmitting information signals received from the system to the card;

d) configuration register means responding to addresses in the address region for providing special purpose registers required by the VXI interface standard.

34. The device of claim 33 wherein the configuration register means includes registers defining at least two individual units addressable by the system according to the second bus interface standard.

35. The device of claim 34 for use with a VXI standard defining at least two classes of units, wherein at least one of the units defined by the registers of the configuration register means can be selectively configured to belong to either of the two classes of units.

36. The device of claim 35 wherein at least one of the units defined by the registers of the configuration register means can be configured to be either a message-based unit or a register-based unit.

* * * * *